(12) United States Patent
Slotznick

(10) Patent No.: US 7,058,356 B2
(45) Date of Patent: Jun. 6, 2006

(54) TELEPHONE DEVICE WITH ENHANCED AUDIO-VISUAL FEATURES FOR INTERACTING WITH NEARBY DISPLAYS AND DISPLAY SCREENS

(76) Inventor: Benjamin Slotznick, 507 Third St., Mt. Gretna, PA (US) 17064

( * ) Notice: Subject to any disclaimer, the term of this patent is extended or adjusted under 35 U.S.C. 154(b) by 990 days.

(21) Appl. No.: 09/880,168

(22) Filed: Jun. 13, 2001

(65) Prior Publication Data

US 2001/0055951 A1    Dec. 27, 2001

Related U.S. Application Data

(60) Provisional application No. 60/211,596, filed on Jun. 15, 2000.

(51) Int. Cl.
*H04H 1/00*    (2006.01)

(52) U.S. Cl. ............... 455/3.05; 455/426.1; 348/14.02; 725/110

(58) Field of Classification Search ............... 455/2.01, 455/3.05, 419–420, 426.1, 552.1; 348/14.02, 348/14.05, 734; 725/109–112, 133, 141, 725/153

See application file for complete search history.

(56) References Cited

U.S. PATENT DOCUMENTS

| | | | |
|---|---|---|---|
| 5,410,326 A | 4/1995 | Goldstein | |
| 5,583,560 A | 12/1996 | Florin et al. | |
| 5,961,603 A | 10/1999 | Kunkel et al. | |
| 6,040,829 A | 3/2000 | Croy et al. | |
| 6,049,539 A | 4/2000 | Lee et al. | |
| 6,351,640 B1 * | 2/2002 | DeMont | 455/426.1 |
| 6,662,007 B1 * | 12/2003 | Yuen | 455/419 |

OTHER PUBLICATIONS

International Search Report for PCT/US01/40967, mail date: Aug. 30, 2001, 1 page.

* cited by examiner

*Primary Examiner*—Lee Nguyen
(74) *Attorney, Agent, or Firm*—Akin Gump Strauss Hauer & Feld, LLP

(57)    ABSTRACT

A telephone device is used to establish two-way communication with a remotely located entity, or to transfer content from a display screen of the telephone device to a nearby display screen for full viewing of the content. The two-way communication is initiated by an object emitting a signal containing a telephone number to the telephone device, which, in turn, automatically dials the telephone number. Alternatively, the object emits a signal containing an electronic address to a telephone device, which, in turn, automatically goes to the electronic address. Transfer of content also is achieved by transmitting an electronic address of content shown on a telephone device display screen to a nearby device which retrieves the content and then displays it on the nearby display screen.

16 Claims, 17 Drawing Sheets

TELEPHONE DEVICE WITH ENHANCED AUDIO-VISUAL FEATURES FOR INTERACTING WITH NEARBY DISPLAYS AND DISPLAY SCREENS

CROSS-REFERENCE TO RELATED APPLICATIONS

This application claims the benefit of U.S. Provisional Application No. 60/211,596 filed Jun. 15, 2000, entitled "TELEPHONE WITH ENHANCED AUDIO-VISUAL FEATURES FOR INTERACTING WITH NEARBY DISPLAYS AND DISPLAY SCREENS."

BACKGROUND OF THE INVENTION

1. Field of the Present Invention

An appliance acts as a wireless phone, a TV remote, and an automatic dialer of phone numbers (or web sites) displayed on the TV.

2. Background

Prototypes of "interactive TV" have required that the home users input data solely in the form of finger clicks (either on a device like a TV remote control or on a device like a keyboard). Some of the keyboards are tethered to the TV (or to a set-top box, also referred to below as a "SetTop box"). Others communicate with the TV (or set-top box) in a wireless manner.

These prototypes have created output solely through the TV (monitor and speakers). Most frequently, the output is merely an increased variety of TV style programming (i.e., more TV channels). More recently, the output has been Internet web style programming (i.e., turning the TV into a web browser and e-mail client), which may include web style interactive activities (e.g., "surfing", "voting", or "purchasing").

These prototype devices have not had deep market penetration despite heavy marketing efforts. Some analysts have claimed that the supposed interactivity interfered with the desired passive viewing experience of the TV medium. Others acknowledged that today's web style experiences are not as visually rich as the current TV medium.

However, for decades, much of TV advertising has tried to get TV viewers to pick up a telephone and call a phone number displayed on the TV in order for the viewer to receive more information or purchase something. Many people have a hard time watching two things at once, but experience no difficulty watching one thing while listening to another (e.g., talking on a cell phone while driving). Television shows have successfully had viewers call in. Examples include Muscular Dystrophy fundraisers, talk shows, and shopping channels such as Home Shopping Network. Some of these formats even broadcast incoming phone calls on the air during the shows. This style of interactivity has been successful and an accepted part of the TV experience.

In addition, recent cellular phones have added a variety of capabilities including Internet access. Some cell phones can be used to pay vending machines (i.e., the user's phone interacts with a soda vending machine so that the soda is paid for by a charge to the user's credit card).

Currently, some cell phones incorporate other electronic technologies. For example, some cell phones include pager technology which enables these phones to act as one-way or two-way pagers. Other cell phones provide the capabilities of a handheld Personal Digital Assistant ("PDA"). A handheld PDA provides a variety of capabilities which nonetheless fall short of a fully featured computer. PDA capabilities differ from one manufacturer to another, but usually include some of the following: an electronic address book (sometimes with automatic phone dialing), a calendar with scheduling software, a "to do" list, an electronic note pad for text and sketches, a voice recorder, a multi-media playback device for music or video, a digital camera, etc. As an example of the convergence of telephone and PDA capabilities, Qualcomm markets a combination cell phone and PDA which is based upon the best selling Palm Pilot PDA. As another example, HandSpring markets a PDA (the "Visor") that allows a plug-in card to transform the PDA into a cell phone.

The size of a hand-held telephone, however, limits the size of any viewing screen it incorporates. This has limited the amount and type of data that can be displayed. Pictures, graphics and large amounts of text are difficult to view and read. Such constraints have limited the usefulness of such Internet connections on cell-phones, especially if the screen is smaller than the screen on a PDA. Information that can be relayed by short text, such as e-mail or stock price, drives the current market for such devices and services. But such devices have not been accepted as a general method of "surfing" the Internet.

Current technology for computer pointer devices no longer requires that a cable connect the pointer device (e.g., a mouse or track ball) to the computer. Instead, current technology enables the pointer device to communicate with the computer in a wireless manner (e.g., by using a Microsoft wireless mouse). Current pointer technology does not require that the pointer device rest on a solid surface. Examples include not only hand held controllers for video games, but also "3 dimensional" mice, which use gyroscopic and other internal devices to sense the extent and direction which a mouse is moved in the air (e.g., Diamond Multimedia GyroMouse).

SUMMARY OF THE INVENTION

The present invention combines a wireless phone with a TV remote (referred to below as a "TV Phone" or a "telephone device") in the following manner. When an advertisement comes on the TV requesting the viewer to call a phone number, the viewer clicks a button on the TV Phone and the call is automatically placed. The user then talks into the TV Phone for the desired purpose (e.g., getting information, giving an opinion, purchasing a product). Different TV "channels" (whether TV style, or Internet style) can be chosen in two manners: by clicking on a button located on the TV Phone or by talking into a TV Phone equipped with a built in speech-to-text voice recognition system.

In some embodiments, the TV Phone acts as a "picture phone," transmitting video along with the audio.

In some embodiments, the phone number or access code is displayed on a real world object other than a TV, such as a billboard, a commercial sign, a printed page (e.g., a magazine), or the like. The real world object includes a wireless transmitter that transmits the phone number or access code to the TV Phone.

In some embodiments, the TV Phone allows the user to surf the Internet using his or her TV Phone, and transmit data to a nearby television screen or computer screen to be displayed.

Instead of having an advertisement (or accompanying an advertisement) appear on the screen, an icon or phone number appears on the screen indicating that a phone call would provide more information about a sports event, news show, product placement, soap opera plot line, etc. Other icons indicate web page information that can be accessed by the device.

The present invention allows a natural verbal and aural interactivity without breaking up the expected linearity of TV programming. It also allows this interactivity without major telecommunications infrastructure upgrades (e.g., broadband home services through two-way cable systems, fiber optics or DSL systems).

In the preferred embodiment, in addition to the television, there is a set-top box which has three inputs (a standard phone line, a cable from the television and a wireless receiver) and a TV Phone. The TV Phone is a cordless phone with a base station in the set-top box. The phone line is the input and output for the telephone portion of the TV Phone. The cable from the television is used to send the signal from the TV blanking interval to the set-top box. Similar to closed captioning for the deaf, this signal transmits data to the set-top box. Here, the data is the telephone number that a TV advertisement or announcement asks the viewer to call.

When the viewer wants to call that number, he or she clicks on a button on the TV Phone. Like other remote controls, this sends a wireless signal to the set-top box. The wireless signal may be an infrared signal, but could be another form of wireless (or even wired) signal. The set-top box is sent the proper phone number via the cable from the TV and the set-top box dials that number.

In an alternative embodiment, the set-top box does not have a phone line, but uses the capacity of a two way cable system attached to the television.

In an alternative embodiment, the set-top box does not have a phone line, but is the transmitting and receiving station for a cellular or wireless phone.

In an alternative embodiment, the set-top box transmits the phone number to the TV Phone, and the TV Phone contains a cell phone or wireless phone which dials the number directly. In this embodiment, the TV Phone need not transmit anything to the set-top box to make the phone call. The set-top box is continuously broadcasting the requisite phone number, and the TV Phone button that is clicked just causes automatic dialing. (However, the TV Phone may have to transmit data to the set-top box if the device includes web surfing options discussed below.)

In an alternative embodiment, the wireless transmitter is built into the TV and is not a separate set-top box.

In an alternative embodiment, the TV Phone does not operate as a TV remote control, but can just launch the automatic dialing.

In an alternative embodiment, the phone number is not transmitted over the blanking interval. Rather, the set-top box transmits which station is being viewed (or the phone number for the station being viewed) and the TV Phone, when activated, dials the station's phone number. The station knows which phone number is being shown on the broadcast (e.g., by having simultaneous input from the station of the number, or by referring to a database with "playlists") and forwards the phone call to that number.

In an alternative embodiment, the set-top box dials the station number (or sends a signal on a two-way cable) and that call is forwarded to the phone number shown on the TV.

In an alternative embodiment, the phone call is not forwarded, but is logged, and the calling device hangs up. Then, the phone call is returned (from the appropriate party) to the TV Phone either directly or through the set-top box.

In some applications, talk over the TV Phone is the only desired communication. In other applications, alphanumeric buttons on the phone can be used (as in phone tree routing) or the other buttons on the TV Phone may signal acceptance, denial or other action.

In some applications, input from the TV Phone has no effect upon the video and audio displayed on the TV. In other applications, input from the phone may cause a change in the video and audio displayed on the TV, e.g., cause transmission of pay per view movie, cause a signal that enables the set-top box to descramble a pay per view movie or channel (while charging the user's account or credit card), cause the TV to display an Internet web page, etc.

In some applications, only verbal input from TV Phone completes a purchase or gives out a credit card number. In other applications, these transactions are automated by clicking a button. This automation may occur by pre-installing the credit card number on the TV Phone, or by "escrowing" it with the selling entity (compare to accounts that users can set up at amazon.com). The automated buying may be accomplished by automatically billing the item to the user's phone number, as with 900 numbers.

In an alternative embodiment, regular cell phones include extra circuitry so that they become TV Phones. When such a TV phone-enabled cell phone is in the presence of a TV Phone set-top box (or a TV with such a set-top box built into it), these cell phones act as a TV Phone and TV remote.

Many cell phones are now becoming Internet enabled, with tiny screens that transmit modified web pages. In an alternative embodiment, these web-enabled cell phones include extra circuitry so that they become TV Phones ("Web-Cell-TV phone"). When in the presence of a TV Phone set-top box (or a TV with such a set-top box built into it), a simple click on one of the TV Phone buttons places the web page currently displayed on the Web-Cell-TV phone onto the TV screen. (This allows not only larger print but considerably more detail.) The user of the Web-Cell-TV phone navigates on this web page and around Internet (when web pages are displayed on the TV) by using the buttons on the Web-Cell-TV phone Phone. Speech recognition software allows the user to navigate the Internet by talking into the Web-Cell-TV phone. Hereinafter, the term "TV Phone" includes "Web-Cell-TV phone".

In an alternative embodiment, the TV Phone may include some or all functions of a PDA. In this embodiment, the TV Phone may include such functions as an electronic address book (with or without automatic dialing), an electronic calendar with scheduling capabilities, a "to do" list, an electronic note pad, multi-media playback devices (e.g., for playing audio including voice and music, video, games, IV broadcasts or narrowcasts, radio broadcasts or narrowcasts, including pre-recorded and live, previously downloaded and streaming, however transmitted, e.g., using broadcast spectrum and over the Internet), a voice recorder and playback device, a digital camera (for either still or moving pictures), a pager, etc. In one embodiment, these functions can be displayed only on the TV Phone. In another embodiment, these functions can be displayed only on a TV with the requisite devices for communicating with the TV Phone. In another embodiment, these functions can be displayed both on the TV Phone and on a TV with the requisite devices for communicating with the TV Phone. For the latter embodiments, pressing a button on the TV Phone (or issuing a voice command to it) causes the desired data or pictures to be displayed on a nearby TV screen.

In an alternative embodiment, the TV Phone contains motion detection devices (such as gyroscopes) so that the TV Phone can operate as a pointing device (e.g., a 3D mouse) with respect to the display on a nearby TV which has the requisite devices for communicating with the TV Phone. In this embodiment, if an Internet web page is displayed on the TV, the TV Phone can be used as a pointing device to navigate the page and click on links. In this embodiment, if a data sheet is displayed on the TV, the TV Phone can be used to navigate it, highlight words, cells, or other data objects for action. In this embodiment, if a picture is displayed on the TV, the TV Phone can click on particular portions of the picture when the portions are linked to hot spots or other triggering devices (similar to hot spots on a web page graphic) which may trigger the placing of a phone call, the retrieval of a web page or other information, the purchase of an item, etc.

In an alternative embodiment, the TV Phone, instead of interacting as described above with a television set with a set-top box, interacts with a computer that has a TV tuner card or circuit. The computer may, but need not, have an Internet connection.

In an alternative embodiment, the TV Phone, instead of interacting with a television set with a set-top box, interacts with a computer that has a monitor, but no TV tuner circuit. This computer may, but need not, have an Internet connection.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DETAILED DESCRIPTION OF THE INVENTION

Figure 1A:
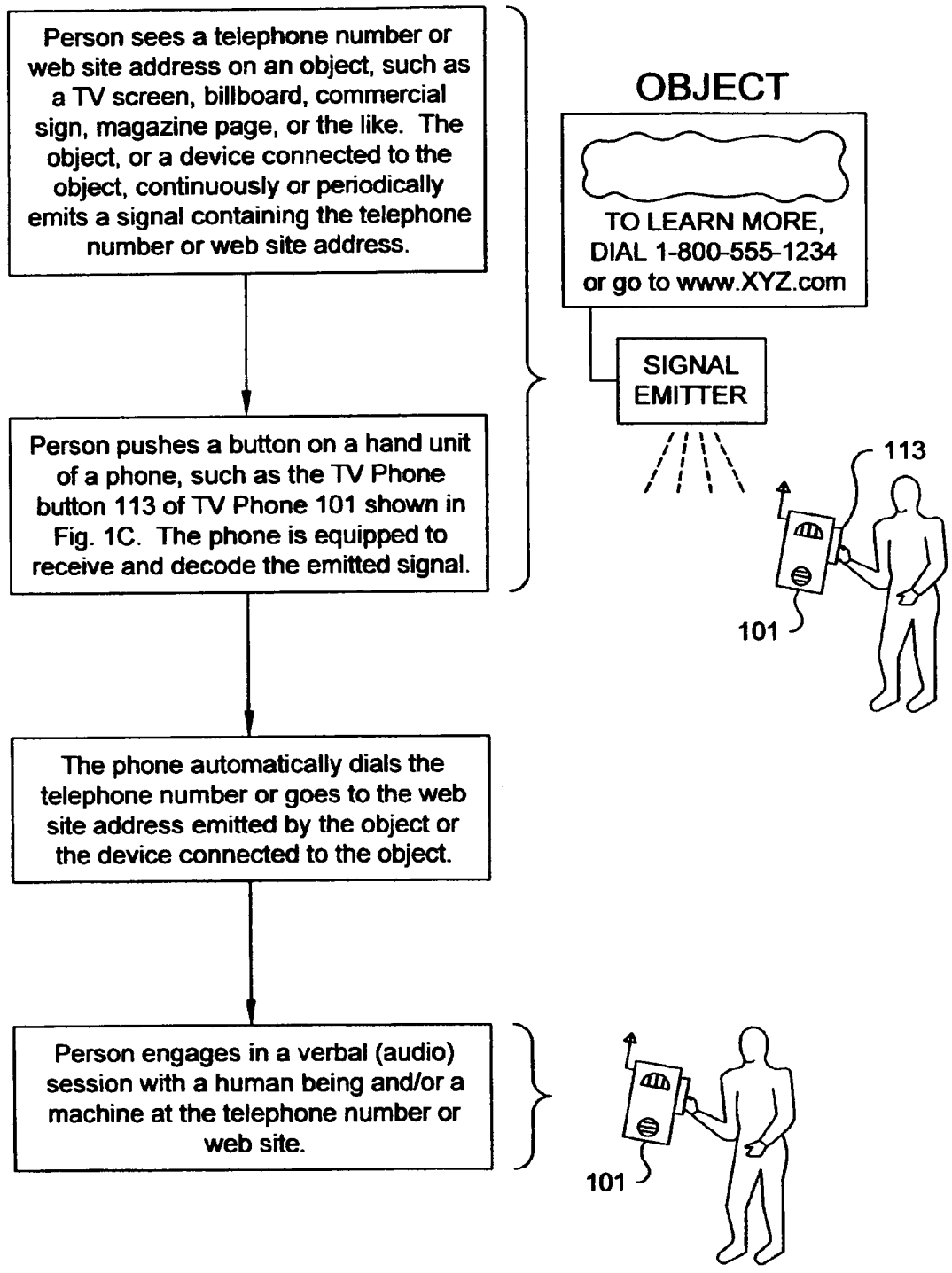
FIG. 1A shows a functional flowchart and pictorial representation of one preferred embodiment of the present invention.

Certain terminology is used herein for convenience only and is not to be taken as a limitation on the present invention.

Definitions

The following definitions are provided to promote understanding of the present invention.

telephone device—A telephone is an instrument that converts voice and other sound signals into a form that can be transmitted to remote locations and that receives and reconverts waves into sound signals. The telephone device described herein performs these conventional functions of a telephone, and also includes enhanced functions which are activated by one or more special or specified buttons. In some embodiments, the telephone device may also transmit images, snapshots, or video. The telephone device is referred throughout the specification as a "TV Phone."

button—In the present invention, the selection of a special or specified button initiates an enhanced function. As used herein, the phrase, "selection of a button" includes selecting a single button, selecting a plurality of specified buttons that must be pressed in a specific sequence, or the selection of a voice command that is preprogrammed to be equivalent to the selection of a specified button or sequence of buttons.

electronic address—In the present invention, an electronic address may be an e-mail address, a web site, an ftp site, or equivalents thereof.

portion of content—In selected embodiments of the present invention, the telephone device includes a display screen that displays content. The content may be a portion of a full content image. As used herein, the "portion of content" may be a truncated or cutoff version of the full content (e.g., cut off at one or more edges), a compressed or low resolution version of the full content, a thumbnail or keyhole of the full content, a text-only version of visual or multi-media content, or the like.

Overview of Present Invention

The present invention provides many different embodiments of an enhanced telephone device, as discussed below.

I. Object emits signal containing a telephone number to a telephone device, which, in turn, automatically dials the telephone number.

A telephone device allows a user to communicate with a remotely located entity. The telephone device includes a button which facilitates communication between the telephone device and the remotely located entity, and a wireless receiver. In the broadest sense, the process operates as follows:

1. An object, or a device connected to an object, emits a signal containing a telephone number of the remotely located entity.

2. The wireless receiver receives the signal emitted by the object or the device connected to the object.

3. The telephone device automatically establishes two-way communication with the remotely located entity upon selection by the user of the button. Selection of the button causes the telephone device to automatically dial the telephone number of the remotely located entity.

The object may be an outdoor sign or billboard, thereby allowing a user to select one button on the telephone device to become instantly (or almost instantly) connected with the entity associated with the outdoor sign or billboard.

The object may be a set-top box of a TV system. If so, then the set-top box receives the telephone number from broadcast signals sent over the TV system. The set-top box then emits a signal containing the telephone number of the remotely located entity. In one system configuration, the telephone device is a wireless telephone device having a base station in the set-top box, and the set-top box is hardwired to a telephone outlet. In this configuration, the hardwired telephone outlet in the base station of the set-top box establishes two-way communication with the remotely located entity. In another system configuration, the telephone device is a cellular telephone device, and a cellular telephone network is used to establish two-way communication with the remotely located entity.

The automatic establishment of two-way communication with the remotely located entity may occur by having the telephone device automatically dial the telephone number of the remotely located entity, and then communicating user identity information to the remotely located entity. The remotely located entity then uses the user identity information to initiate a call to the telephone device. In one preferred embodiment of the present invention, the user identity information is the telephone number of the telephone device. Alternatively, the user identity information may be a customer number or other customer identifying information, and the remotely located entity may use a database or table lookup to locate the telephone number of the user to initiate a call to the user's telephone device.

The user preferably engages in an audio session with a person or machine at the remotely located entity upon establishing the two-way communication. In other instances, the session may be audiovisual.

The telephone device preferably includes transceiver circuitry associated with normal telephone communication functions which is separate from the wireless receiver. If so, then the two-way communication uses only the transceiver circuitry.

The device connected to an object may be a wireless transmitter connected to a television. If so, then the television receives the telephone number from broadcast signals received by the television, and the wireless transmitter connected to the television emits a signal containing the telephone number of the remotely located entity.

II. Object emits signal containing an electronic address to a telephone device, which, in turn, automatically goes to the electronic address.

A telephone device allows a user to communicate with a remotely located entity. The telephone device includes a button which facilitates communication between the telephone device and the remotely located entity, and a wireless receiver. In the broadest sense, the process operates as follows:

1. An object, or a device connected to an object, emits a signal containing an electronic address of the remotely located entity.

2. The wireless receiver receives the signal emitted by the object or the device connected to the object.

3. The telephone device automatically establishing communication with the remotely located entity upon selection by the user of the button. The selection of the button causes the telephone device to automatically contact the electronic address contained within the emitted signal.

The electronic address may be a web site address of the remotely located entity. If so, then selection of the button causes the telephone device to automatically go to the web site address of the remotely located entity. The telephone device may further include a display screen that displays content. If so, then the web site of the remotely located entity displays content on the display screen retrieved by the telephone device during the communication with the remotely located entity.

The automatic establishment of two-way communication with the remotely located entity may occur by having the telephone device automatically dial the telephone number of the remotely located entity and communicate user identity information to the remotely located entity. The remotely located entity then uses the user identity information to initiate a call to the telephone device.

In one preferred embodiment of the present invention, the user identity information is the telephone number of the telephone device. Alternatively, the user identity information may be a customer number or other customer identifying information, and the remotely located entity may use a database or table lookup to locate the telephone number of the user to initiate a call to the user's telephone device.

The telephone device preferably includes transceiver circuitry associated with normal telephone communication functions which is separate from the wireless receiver. If so, then the two-way communication uses only the transceiver circuitry.

III. Transmission of content shown on a telephone device display screen to a nearby display screen.

A telephone device is used to view content on a nearby display screen which is not physically connected to the telephone device. The telephone device includes a display screen which displays content, a button which facilitates communication of content between the telephone device and a local control device connected to the nearby display screen, and a wireless transmitter. In the broadest sense, the process operates as follows:

1. Content is stored in the telephone device.

2. The content is displayed on the display screen of the telephone device.

3. The content is communicated from the telephone device to the local control device via a signal sent by the wireless transmitter upon selection of the button.

4. The local control device receives the signal and provides the content to the nearby display screen for display thereon.

The local control device may require the use of a decoder to convert the signal received from the telephone device into a format for viewing by the nearby display screen.

The content shown on the telephone device display screen may be a portion of a full content image. If so, then the full content image is provided to the local control device for display on the nearby display screen.

IV. Transmission of electronic address of content shown on a telephone device display screen to a nearby display screen (scheme 1)

A telephone device is used to view content on a nearby display screen which is not physically connected to the telephone device. The telephone device includes a display screen which displays content, or a portion thereof, a button which facilitates communication of content between the telephone device and a local control device connected to the nearby display screen, and a wireless transmitter. In the broadest sense, the process operates as follows:

1. Content, or a portion thereof, and an electronic address of the content are stored in the telephone device.

2. The content, or a portion thereof, is displayed on the display screen of the telephone device.

3. The electronic address of the content is communicated from the telephone device to the local control device via a signal sent by the wireless transmitter upon selection of the button.

4. The local control device receives the signal and transmits a request over an electronic network to retrieve the content from a remote location.

5. Upon receiving the content, the local control device provides the content to the nearby display screen for display thereon.

The content shown on the telephone device display screen may be a portion of a full content image. If so, then the full content image is provided to the local control device for display on the nearby display screen.

In one preferred embodiment of the present invention, the electronic address is a web site address, the remote location is a web site, and the electronic network is the Internet.

In another preferred embodiment, the content, or a portion thereof, that is stored in the telephone device is retrieved from a remote source.

In yet another preferred embodiment, the local control device further comprises a payment module which tracks usage charges for providing content to the nearby display screen. In this scheme, the telephone device communicates customer identity information, such as the telephone number of the telephone device, to the payment module. The payment module inhibits the completion of the process unless the payment module properly authorizes the telephone device to use the display screen for viewing content. In this embodiment, the local control device may be part of a kiosk having a large screen display for viewing content.

V. Transmission of electronic address of content shown on a telephone device display screen to a nearby display screen (scheme 2).

A telephone device is used to view content on a nearby display screen which is not physically connected to the telephone device. The telephone device includes a display screen which displays an electronic address of content, a button which facilitates communication of the electronic address between the telephone device and a local control device connected to the nearby display screen, and a wireless transmitter. In the broadest sense, the process operates as follows:

1. The telephone device retrieves an electronic address of content from a remote source, and stores the electronic address in the telephone device.

2. The electronic address is displayed on the display screen of the telephone device. (In this scheme, content, or a portion thereof, associated with the electronic address is not necessarily displayed on the display screen of the telephone device.)

3. The electronic address is communicated from the telephone device to the local control device via a signal sent by the wireless transmitter upon selection of the button.

4. The local control device receives the signal and transmits a request over an electronic network to retrieve content at the electronic address from a remote location.

5. Upon receiving the content, the local control device provides the content to the nearby display screen for display thereon.

Scheme 2 may have a similar payment module and kiosk layout as the scheme 1. Scheme 2 may also use a web site address as the electronic address.

VI. A telephone number is shown on display screen, and a wireless telephone device automatically dials the telephone number.

A wireless telephone device and a set-top box of a TV system allow a user to communicate with a remotely located entity. The wireless telephone device includes a button which facilitates communication between the telephone and the remotely located entity. The set-top box includes a base station of the wireless telephone device. The set-top box is in communication with a telephone system and is also connected to a television. In the broadest sense, the process operates as follows:

1. The set-top box stores a telephone number and causes telephone number information to be displayed on the television.

2. Upon selection by the user of the button, the telephone device sends a signal to the set-top box to dial the telephone number, thereby establishing two-way communication between the telephone device and the remotely located entity via base station and the telephone system.

The user may engage in an audio session with a person or machine at the remotely located entity upon establishing the two-way communication.

In one preferred embodiment, the set-top box prestores a listing of telephone numbers corresponding to specified television stations, and the dialed telephone number is the prestored telephone number of the currently active television channel. The television station may automatically forward any received telephone calls to a telephone number of the remotely located entity.

The establishment of two-way communication with the remotely located entity may occur by the telephone device sending a signal to the set-top box to dial the telephone number of the remotely located entity and communicating user identity information to the remotely located entity, and the remotely located entity using the user identity information to initiate a call to the telephone device. The user identity information may be the telephone number of the telephone device.

The telephone system is preferably external to the TV system, but may alternatively be internal to the TV system. In either embodiment, the telephone system preferably uses the TV system for establishing and maintaining the two-way communication.

The telephone number information may be a telephone number stored at the set-top box. Alternatively, the telephone number information may be a telephone icon which indicates that the telephone number stored at the set-top box will be dialed upon selection of the button. In yet another alternative scheme, the telephone number information is the telephone number stored at the set-top box and a telephone icon which indicates that the telephone number stored at the set-top box will be dialed upon selection of the button.

The set-top box may receive the telephone number stored therein from broadcast signals sent by the TV system.

DETAILED DESCRIPTION

Figure 1B:
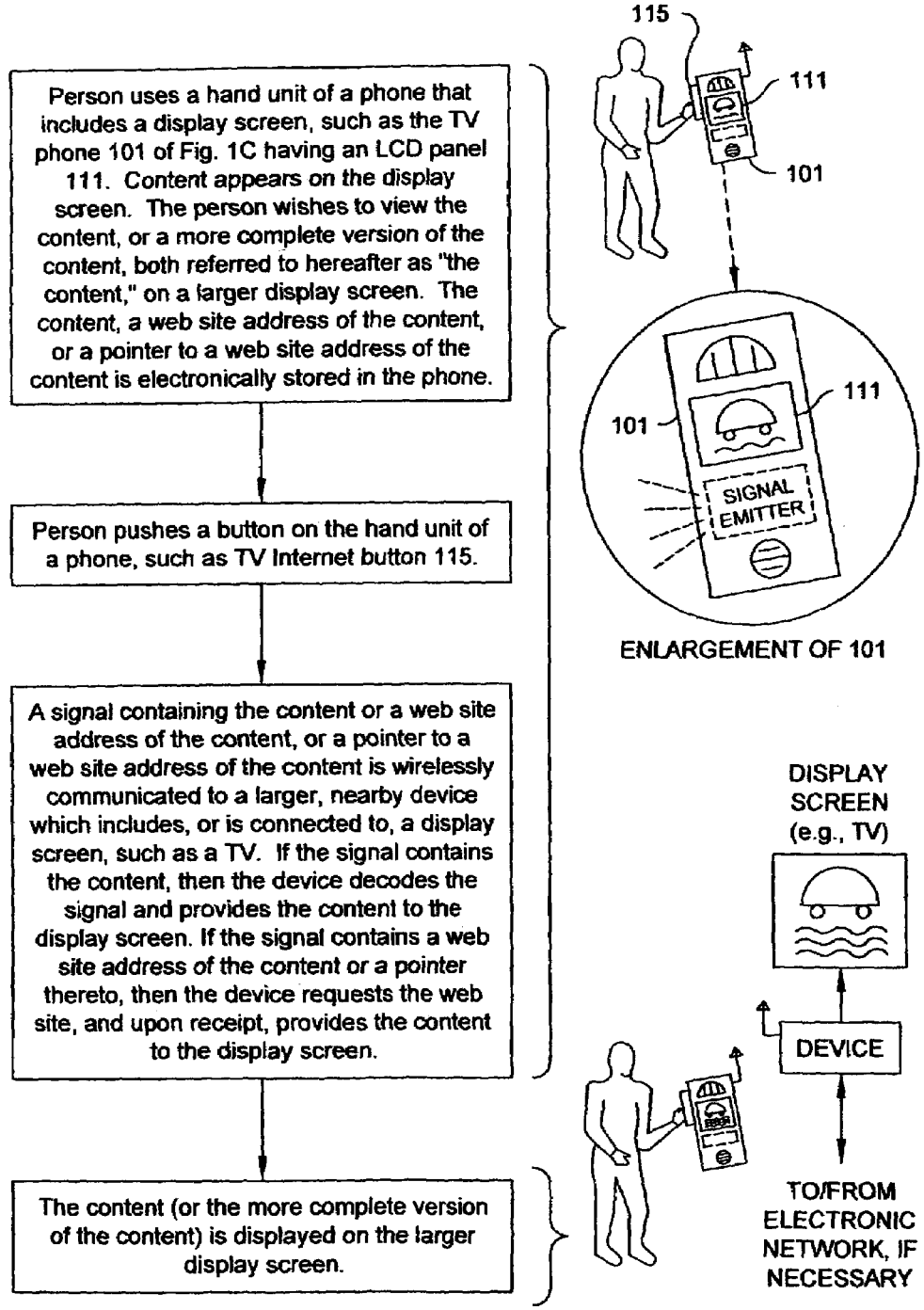
FIG. 1B shows a functional flowchart and pictorial representation of another preferred embodiment of the present invention.

FIG. 1A and FIG. 1B provide self-explanatory summary overviews of two embodiments of the present invention, both of which are described in more detail below with respect to the remaining figures. Thus, no detailed descriptions are provided herein of these figures.

Referring to FIG. 1B, in an alternative embodiment of the present invention, the TV phone acts as an input device (e.g., a mouse, pointing device, keyboard) to a WebTV-type device connected to the display screen.

Figure 1C:
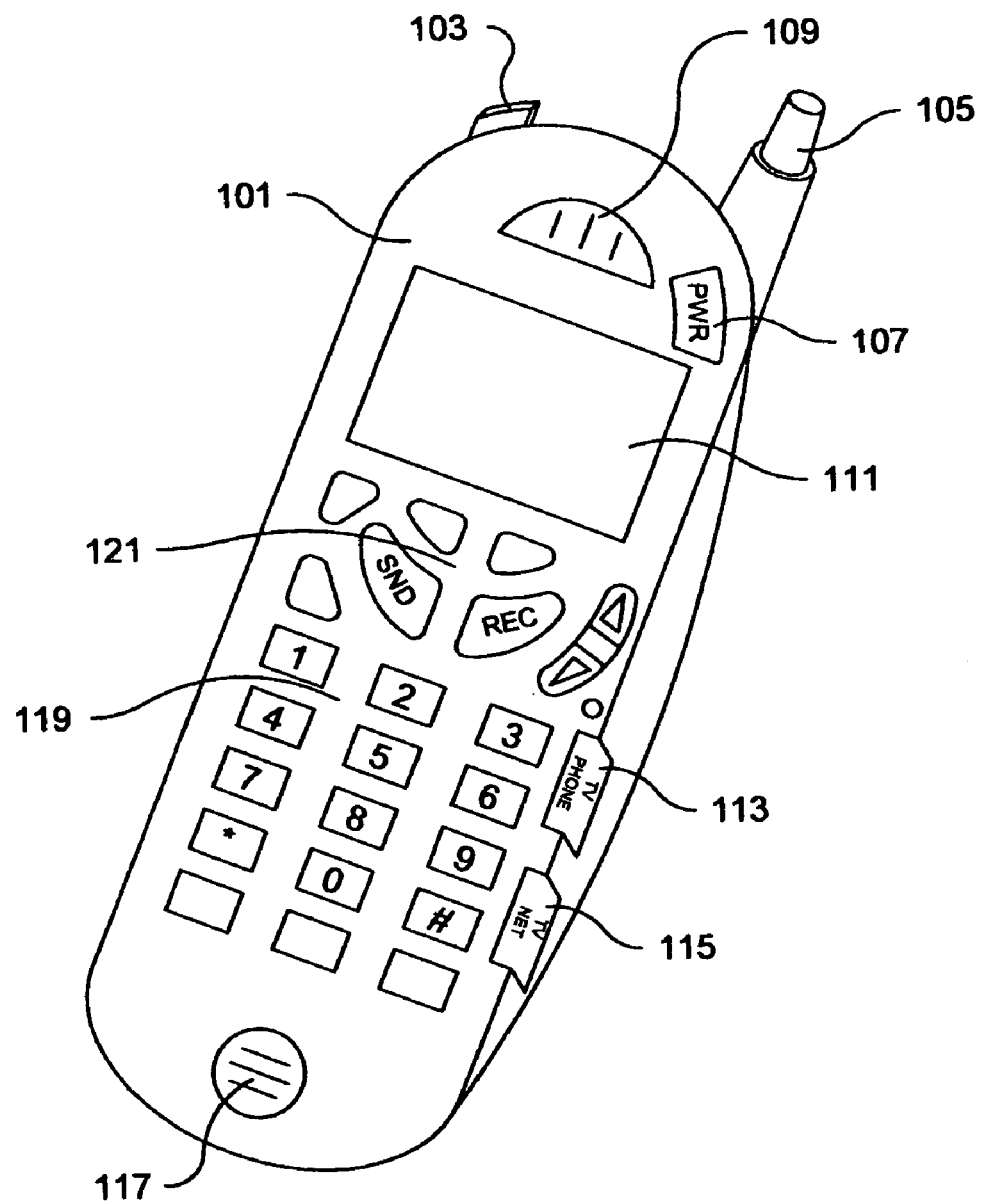
FIG. 1C shows an outside view of the hand unit of a TV Phone.

FIG. 1C shows the hand unit of a TV Phone 101. Some of its features are similar to those of a standard wireless telephone such as a microphone 117, a speaker 109, an alphanumeric keypad 119, a control keypad with SEND and RECEIVE keys 121, a power on and off switch 107, an antenna 105, an LCD panel 111. Special features of the TV Phone are an antenna 103 for communicating with the TV or set-top box and a special TV Phone button 113. In an alternate embodiment, both antennae are combined into one. In another alternate embodiment, the special TV Phone button is replaced by requiring the user to click on two standard buttons at the same time or clicking on a sequence of standard buttons. Also shown is a special TV Internet button 115 which allows the TV Phone to operate an Internet appliance which may be stand-alone, operating as a set-top box to the television, or integrated into the TV Phone set-top box. In an alternate embodiment, this button 115 is eliminated or its function is replaced by some other standard button or combination of buttons. In alternate embodiments, the special buttons 113 and 115 are replaced by speech recognition software embedded in the TV Phone 101. In alternate embodiments, some of these features may be eliminated, or their location moved or their size altered.

Figure 2:
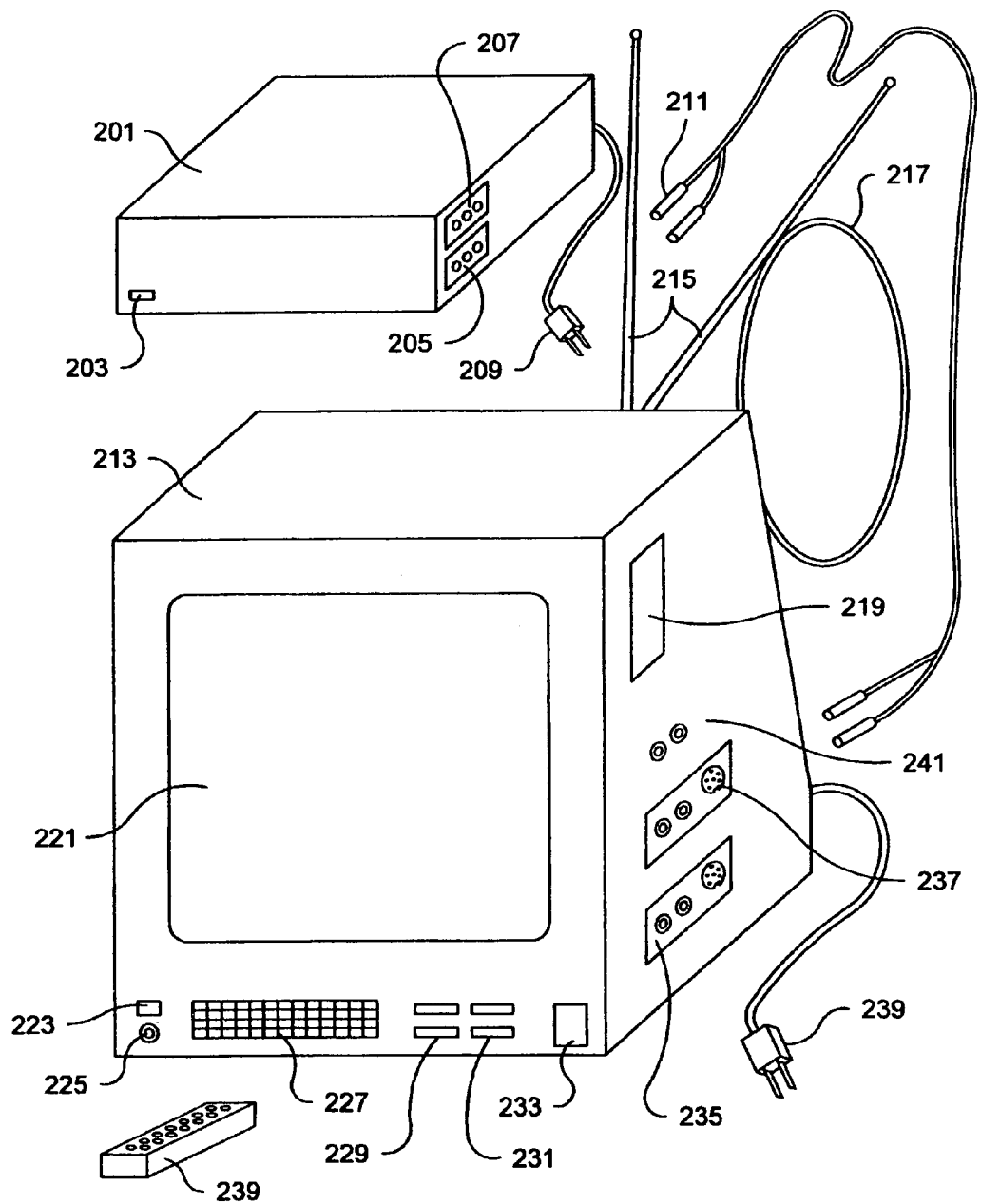
FIG. 2 shows an outside view of a television set used with a TV Phone and a TV phone-SetTop Box used in conjunction with the television set and the TV Phone.

FIG. 2 shows a standard television 213, a TV Phone set-top box 201, and a cable 211 for connecting them.

The standard television 213 in FIG. 2, includes a screen 221 for viewing, a speaker for listening 227, a jack for an earphone 225, a power on and off switch 233, buttons for changing channels 229, buttons 231 for increasing and decreasing volume of sound coming from the speaker 227 or earphone jack 225, a hand-held remote control 239, and a wireless antenna 223 for receiving input from the remote control 239. The standard television 213 also includes a recessed panel 219, behind which is a set of controls for fine tuning channels, adjusting color, fixing horizontal and vertical stability, etc. (These controls are not shown.) The standard television 213 also includes input jacks 237, output jacks 235, a VHF antenna 215, a UHF antenna 217, other jacks 241 such as for connecting to a cable television service, and a power cord with plug 239. In an alternative embodiment, the power cord is replaced by a battery pack (not shown). Alternate embodiments include other optional features typical of television sets (not shown) such as, but not limited to, special connections for cable, video, audio, VCR, Internet, WebTV®, CD, DVD or TiV® devices. Alternate embodiments include these optional features in the television set itself (not shown) along with control pads for them (not shown).

The TV Phone set-top box 201 shown in FIG. 2, includes input jacks 207, output jacks 205, a power cord with plug 209 and a wireless antenna for transmitting data to and receiving data from the TV Phone 101.

The connection cord 211 connects from an output jack 235 of the television 213 to the input jack 207 of the TV Phone set-top box 201 as well as connecting the output jack 207 of the TV Phone set-top box 201 to the input jack 237 of the television 213.

The TV Phone set-top box may sit on top of the television, or next to it or somewhere close. In an alternate embodiment, the TV Phone set-top box 201 is built into the television set 213. In an alternate embodiment, the TV Phone set-top box is built into another appliance connected to the television, such as, but not limited to, a cable television set-top box, a satellite TV set-top box, a VCR, a CD player, DVD player, a gaming console like the Sony Playstation, a TiVo player (or Replay player) that allows delayed viewing of television shows by incorporating digital storage such as a hard disc, a Web TV set-top box, or other Internet appliance.

Figure 3:
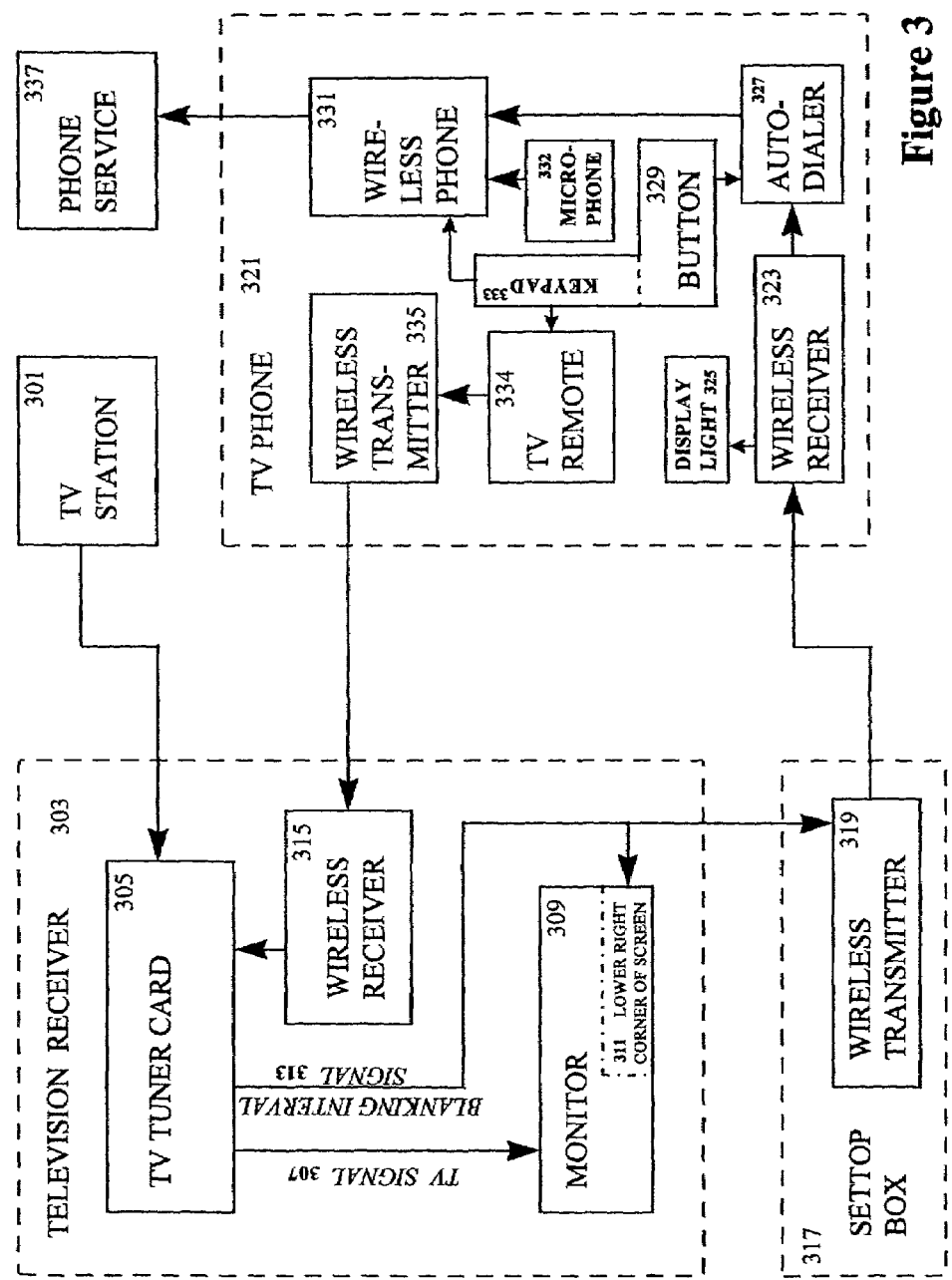
FIG. 3 shows the data flows associated with a preferred embodiment of the present invention, in which the TV Phone operates as a wireless cellular phone.

FIG. 3 shows a diagrammatic view of the present invention. Under normal operation of the television set 213, designated also as the television receiver 303 in FIG. 3, a television signal is transmitted from a television station 301 to the television set 213 either wirelessly, through the air or through a conduit such as a television cable, or fiber optic line, or some combination. The television set picks up the signal through antenna 215 and 217 or an input jack 241. Within the television receiver 303, the signal is routed to a TV tuner card 305 which processes the signal. The images in the TV signal 307 are sent to the monitor 309 (also designated in FIG. 2 as the screen 221) and the sound sent to the speaker 227 and earphone jack 225 (shown in FIG. 2 but not in FIG. 3). (Some units have more than one speaker, or have stereo speakers.) Signals that come over the blanking interval, such as closed captioning for the hearing impaired, are displayed on a portion of the monitor such as the lower right corner of the screen 311. (In other embodiments, these signals may be displayed on other or different portions of the screen.) The blanking interval currently accommodates various signals besides closed captioning. In this embodiment, the blanking interval includes a telephone number that can be called for certain information, such as with advertisements. This number is displayed 309 and the number is also sent to the SetTop Box 317. An icon is displayed alongside the telephone number on the lower right corner of the screen 309 which indicates that it is accessible via the TV Phone. In some embodiments, the icon is displayed without the telephone number, in other embodiments, the telephone number is displayed without the icon. In other embodiments, the location on the screen for display of phone numbers or icons differs.

When the telephone number (actually, data which contains the telephone number) is sent to the SetTop Box 317, it is transferred to a wireless transmitter 319 in the SetTop Box 317. In a preferred embodiment, the wireless transmitter 319 uses parts of the infrared electromagnetic spectrum. In other preferred embodiments, the wireless transmitter uses other portions of the electromagnetic spectrum, such as those used by the BlueTooth® wireless protocol. The wireless transmitter transmits the data containing telephone number. The data is received by the wireless receiver 323 in any nearby TV Phone 321. When such a signal is received, the TV phone 321 loads the number into an auto-dialer 327 and activates a display light 325. (In an alternate embodiment, the TV Phone 321 beeps or emits an audible sound, when the signal is received.) When the user presses a specific button 329 on the TV phone keypad 333, the autodialer 327 will be activated. This causes the wireless phone 331 portion of the TV phone 321 to access the wireless phone service 337 (e.g., a cell phone network) by dialing the number that had been received from the TV Station 301 over the blanking interval signal and passed from the Television Receiver 303 through the SetTop Box 317 to the TV phone 321. If the number is not busy, the user may talk through the microphone 323 of the TV Phone 321 to parties at the other end, or may enter data using the keypad 333.

The TV phone 321 also can be used as a remote control for the Television Receiver 303. When used as a remote control, the keypad 333 of the TV Phone 321 activates the circuitry of encoding and circuitry associated with a TV remote control device 334 which is built into the TV Phone 321. The TV remote control circuitry 334 transfers its data to a wireless transmitter 335 which sends that data to a wireless receiver 315 in the Television Receiver 303. The wireless transmitter 335 in the TV Phone 321 uses a different portion of the electromagnetic spectrum as the wireless transmitter 319 in the SetTop Box 317. (An alternate embodiment of the present invention uses the same portion of the spectrum or the same protocol for communication over such spectrum.) The wireless receiver 315 receives data for changing a channel, increasing or decreasing volume of audio, powering the system on or off, or the like, in the same manner it receives data from a standard TV remote control device, and then forwards the commands to the TV tuner card 305, which executes the desired operation.

Figure 4:
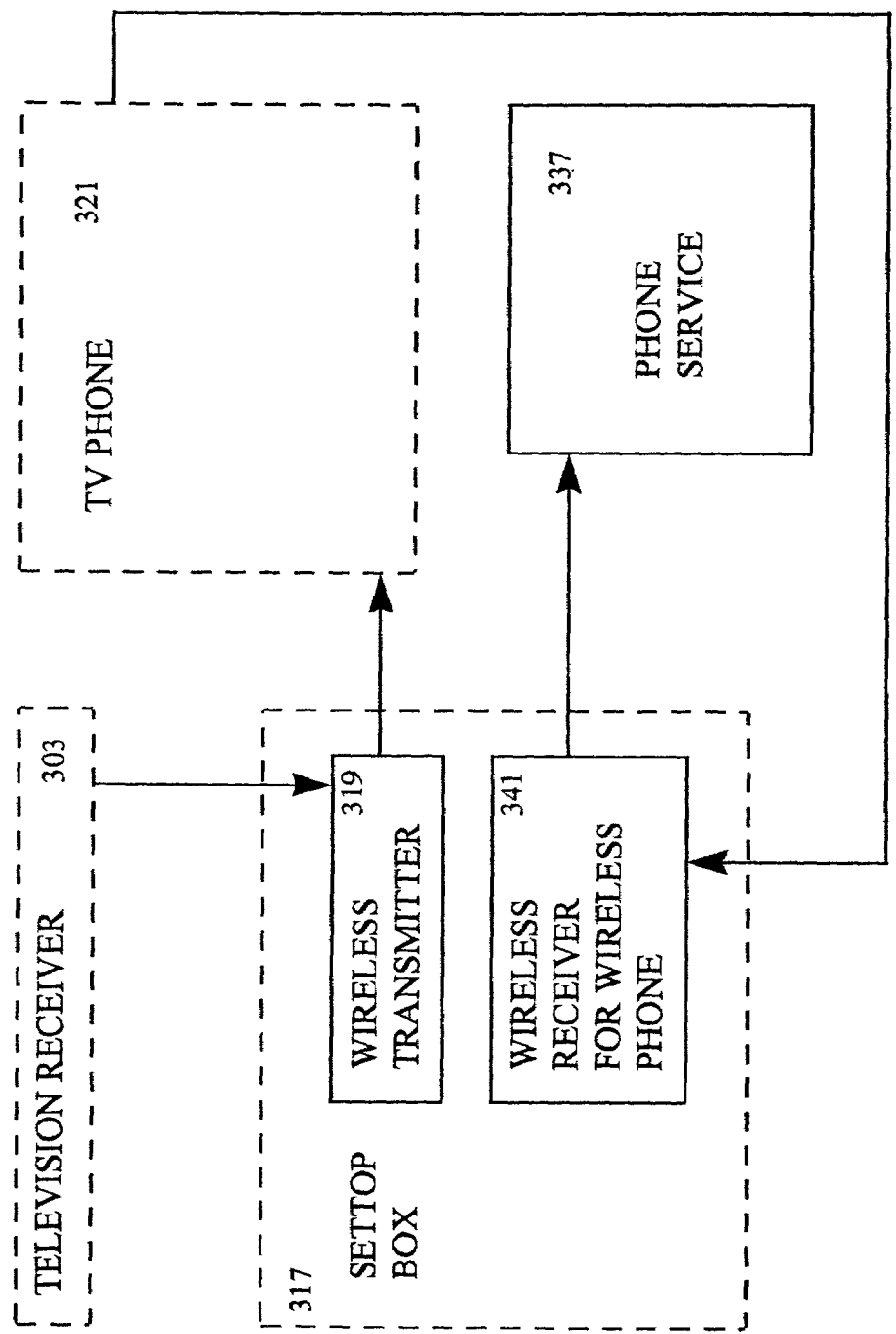
FIG. 4 shows the data flows associated with an alternate preferred embodiment of the present invention in which the TV Phone operates as a home cordless phone that connects wirelessly to a home base station which is connected by wire to the phone system.

In FIG. 4, the TV Phone only transmits phone signals for a short distance, such as in a home cordless phone system. The TV Phone does not transmit the signal directly to the phone service 337, but rather transmits the phone signal to a wireless receiver 341 built into the SetTop Box 317. This SetTop Box 317 operates like the base station of a home cordless telephone. The SetTop Box 317 is connected to the phone service 337 and the wireless receiver 341 transfers the telephone signal from the TV Phone 321 to the phone service 337. Other elements of the system, such as the television receiver 303 and the wireless transmitter 319 in the SetTop Box 317, are the same as in FIG. 3.

Figure 5:
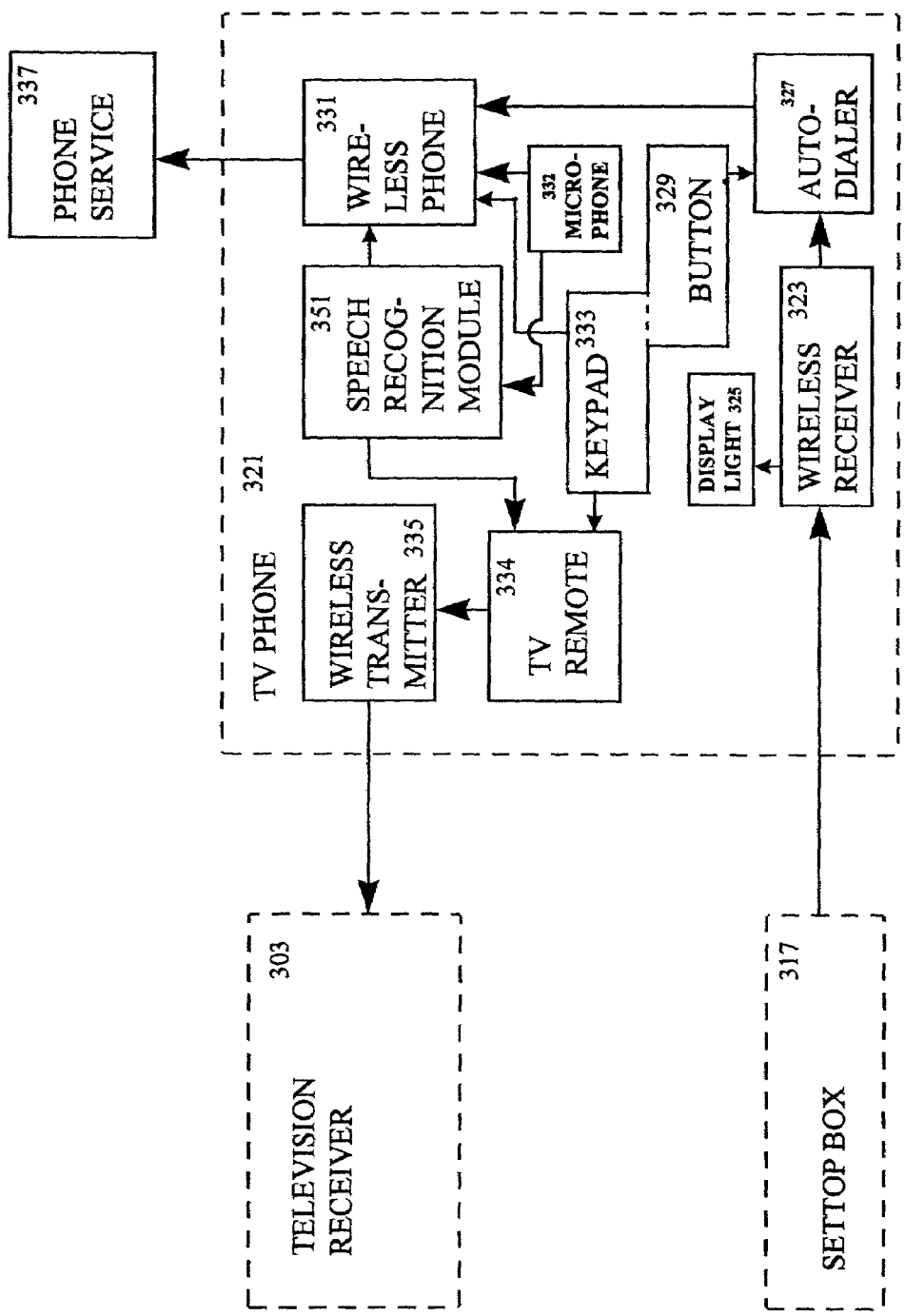
FIG. 5 shows the data flows associated with an alternate embodiment of the present invention, in which the TV Phone incorporates a speech recognition module.

In FIG. 5, the TV Phone incorporates a speech recognition module 351 as an input device in addition to a keypad 333. In this embodiment, commands and data entries can be accomplished by speaking into the microphone 332. The speech recognition module 351 translates the spoken words into data commands that are recognized by the wireless phone 331 or the TV remote control module 334 as appropriate. For example, the command "SEND" is a command for the wireless phone, whereas the command "SWITCH TO CHANNEL 5" is a command for the TV remote module. Other elements of the system are the same as shown in FIG. 3.

Figure 6:
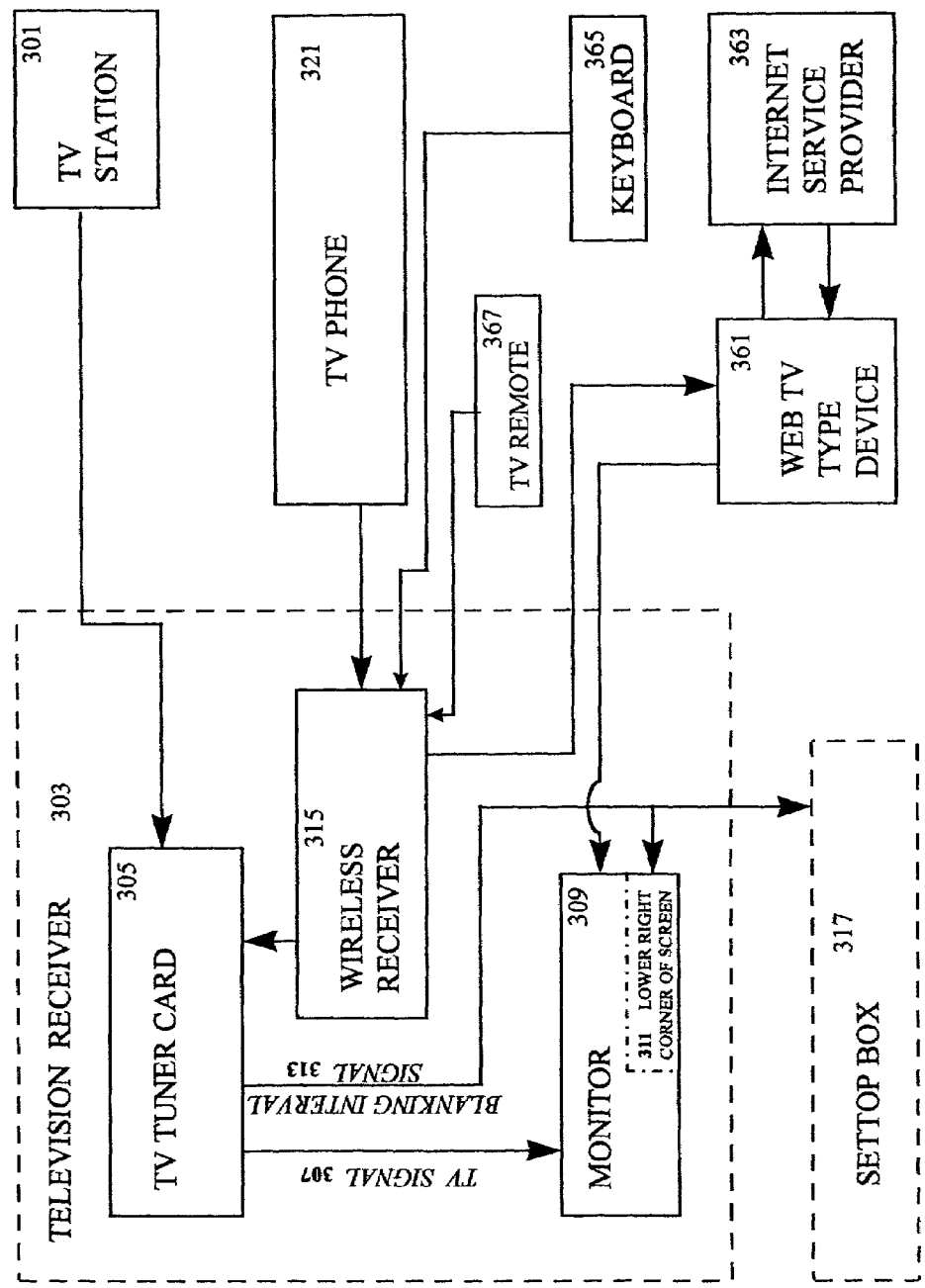
FIG. 6 shows the data flows associated with an alternate embodiment of the present invention which works in conjunction with a WebTV device.

FIG. 6 shows the same configuration of TV Phone as in FIG. 3, except that the user has hooked up a typical WebTV type device 361 to the television. The wireless receiver 315 is connected to the WebTV type device 361, which is connected to the monitor 309 and an Internet Service Provider 363. The connection to the Internet Service Provider can be via dial-up modem through the telephone system, via cable modem through a cable TV network, via a wireless cable network, via a satellite dish, or any combination thereof. A wireless keyboard 365 is also part of the system. (In alternate embodiments, the keyboard is tethered to either the TV or the WebTV type device.) When the WebTV device 361 receives data from the Internet Service Provider 363, the data is displayed on the TV monitor 309. The user can input information to the WebTV device (e.g., by clicking on hyperlinks or by typing e-mail) using the keyboard 365 or the TV remote 367. In an alternate embodiment, the wireless receiver for the WebTV is distinct from the wireless receiver for the TV receiver's remote control. In an alternate embodiment, the wireless receiver for the WebTV 315 is physically located in the housing of the WebTV device 361.

Input to the remote control module in the TV Phone 321 (not shown in FIG. 6, but shown as 334 in FIG. 3) and the keypad in the TV Phone 321 (not shown in FIG. 6, but shown as 333 in FIG. 3) control the WebTV device in the same way as the TV remote 367 (also shown as 239 in FIG. 2) and keyboard 365.

Other elements of the system shown in FIG. 6 are the same as shown in FIG. 3.

Figure 7:
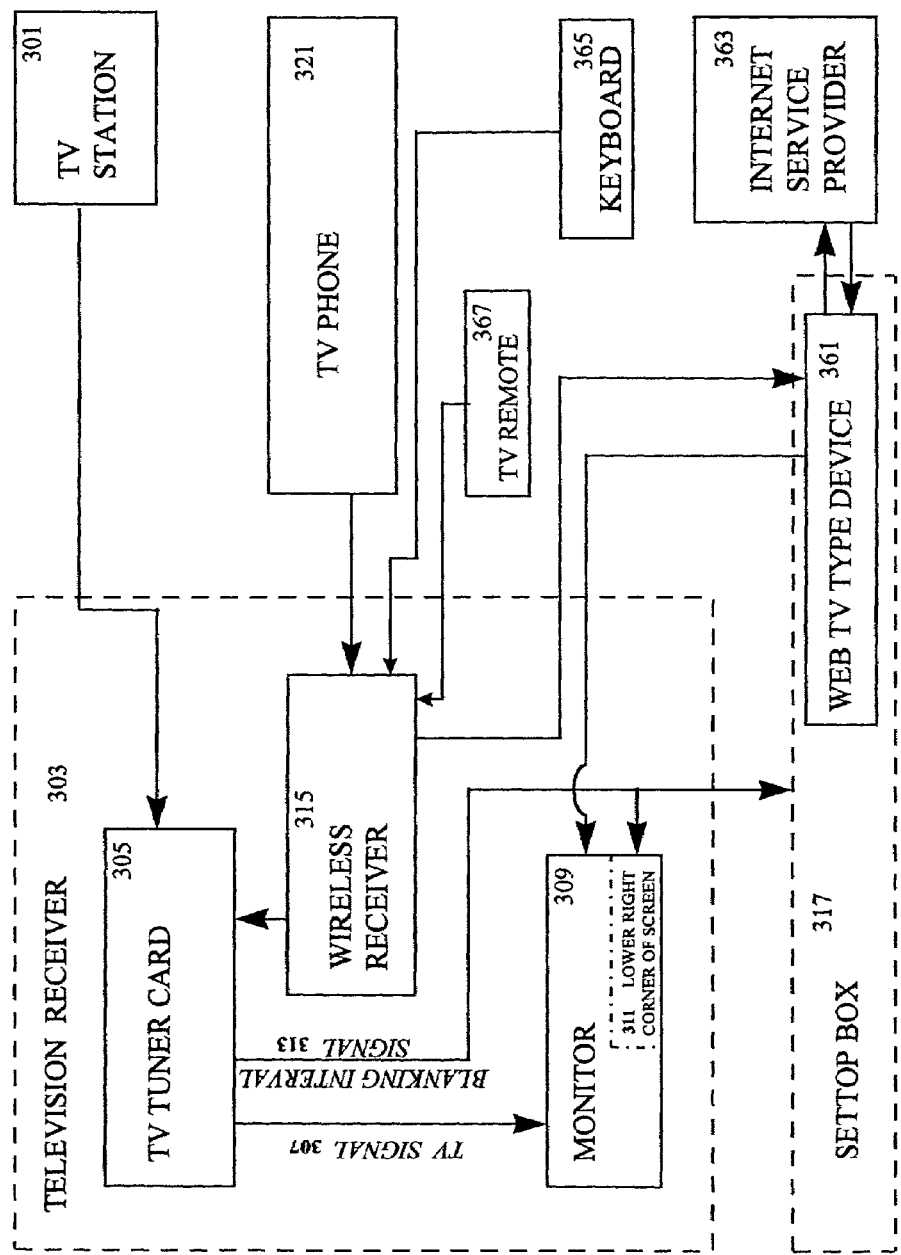
FIG. 7 shows the data flows associated with an alternate embodiment of the present invention in which a WebTV device is incorporated into the TV Phone SetTop Box.

FIG. 7, shows an alternative embodiment in which the WebTV type device 361 is located in the housing of the TV Phone SetTop Box 317. The data flows are the same as in FIG. 6, except the physical location of the WebTV type device has moved. Other elements of the system shown in FIG. 7 are the same as shown in FIGS. 6 and 3.

Figure 8:
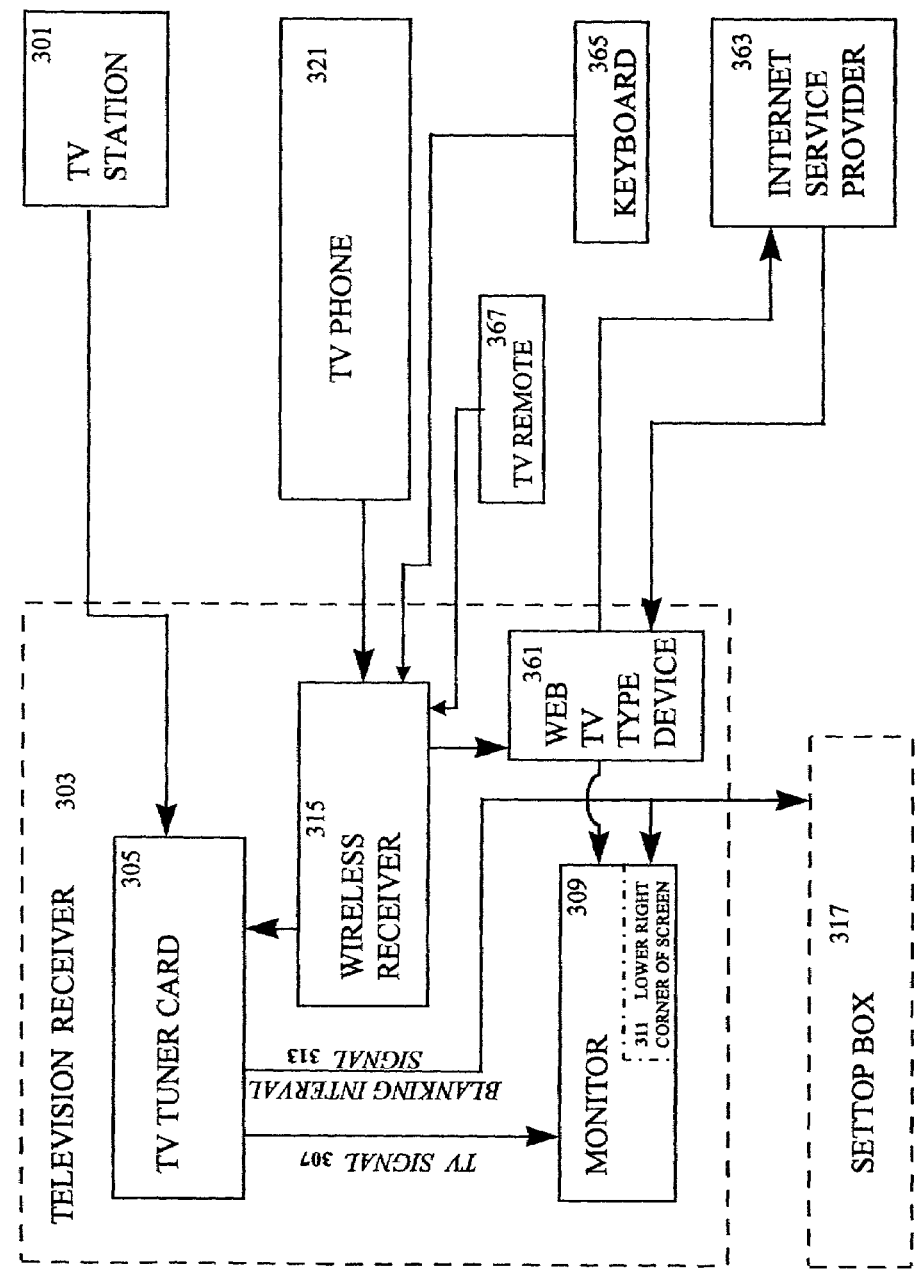
FIG. 8 shows the data flows associated with an alternate embodiment of the present invention in which a WebTV device is incorporated into the television receiver.

FIG. 8, shows an alternative embodiment in which the WebTV type device 361 is located in the housing of the TV Receiver 303. The data flows are the same as in FIG. 6, except the physical location of the WebTV type device has moved. Other elements of the system shown in FIG. 8 are the same as shown in FIGS. 6 and 3.

Figure 9:
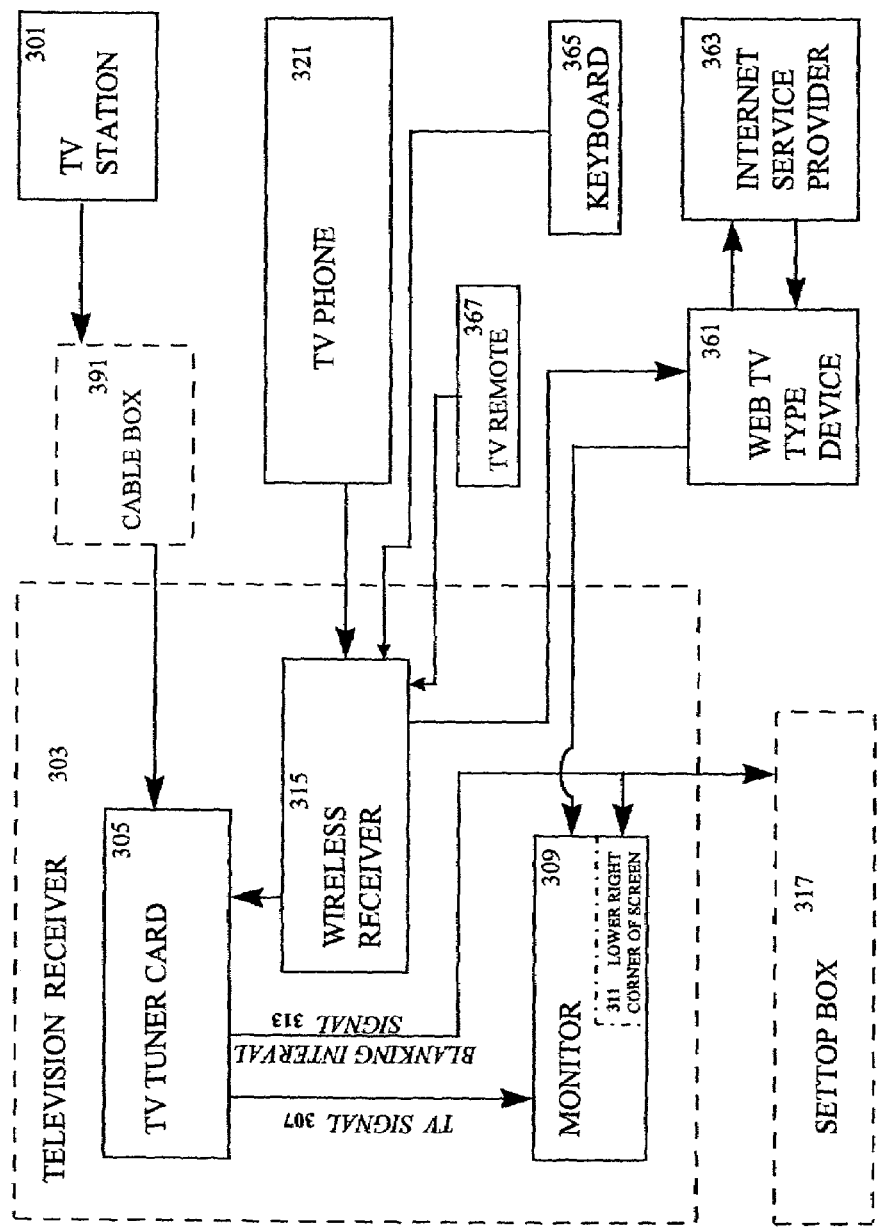
FIG. 9 shows the data flows associated with an alternate embodiment of the present invention in which television signals are received via a cable television network.

FIG. 9, shows an alternative embodiment in which the television receiver 303 is connected to a cable television network via a cable TV box 391. The television tuner card 305 receives broadcasts from the TV station 301 through the cable network and the cable TV box 391, rather than through an antenna 215 or 217. In all other respects, elements of the system shown in FIG. 9 are the same as shown in FIGS. 6 and 3.

Figure 10:
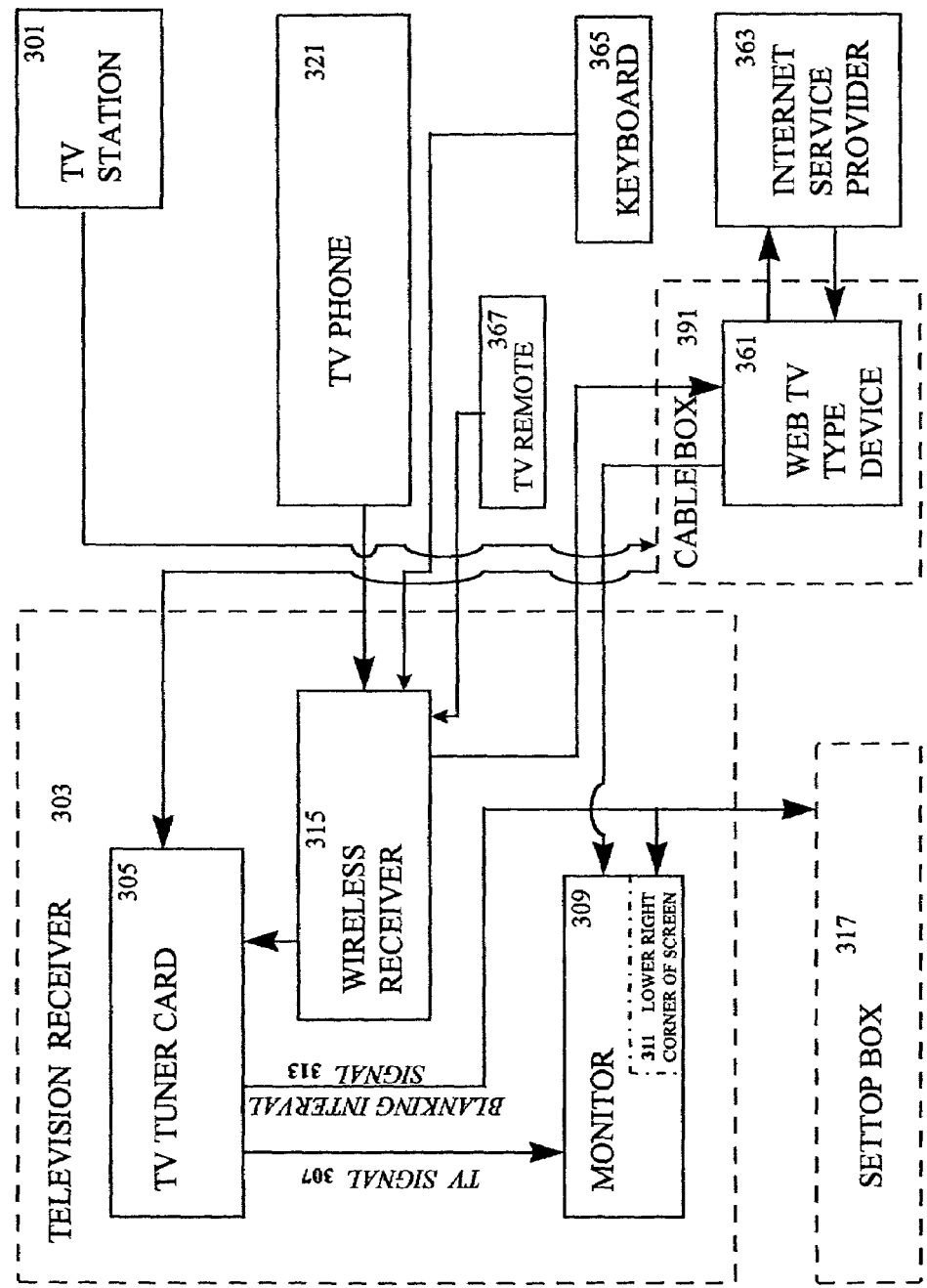
FIG. 10 shows the data flows associated with an alternate embodiment of the present invention in which a WebTV device is incorporated into the set-top box associated with the cable television network.

FIG. 10, shows an alternative embodiment in which the WebTV type device 361 is located in the housing of the cable TV box 361. The data flows are the same as in FIG. 9 and 6, except the physical location of the WebTV type device has moved. Other elements of the system shown in FIG. 10 are the same as shown in FIGS. 9, 6 and 3.

Figure 11:
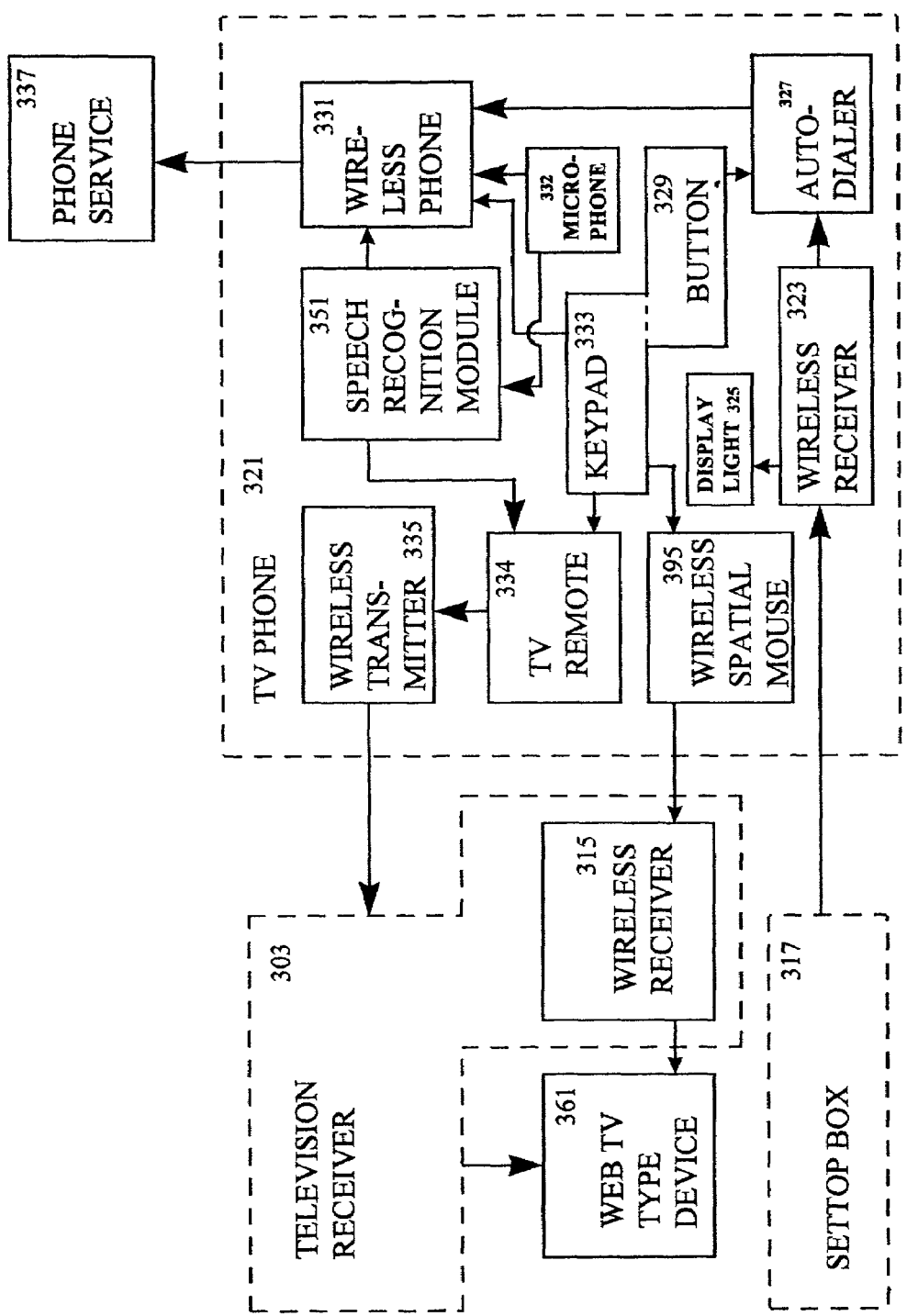
FIG. 11 shows the data flows associated with an alternate embodiment of the present invention in which the TV Phone contains a wireless spatial mouse that communicates with a WebTV type device.

FIG. 11 shows an alternate embodiment of the present invention in which the TV Phone contains a wireless spatial mouse 395 that operates with a WebTV type device 361. The WebTV device 361 may be located in the television receiver housing 303, in the TV Phone SetTop Box housing 317, in another housing such as a cable TV set-top box 391, or by itself as in FIG. 6. As the user moves the TV Phone in space, the gyroscopic sensors in the wireless spatial mouse 395 sense the change in position and send that change wirelessly to the wireless receiver 315. The wireless receiver transfers the data on the change in position to the WebTV type device 361 which causes a cursor to move on the monitor (309 in FIG. 6). The user can "select" items on the screen, i.e., perform "mouse clicks", by clicking one or more of the keys on the TV Phone keypad 333. The click is transmitted though the wireless spatial mouse 395 to the wireless receiver 315 and thence to the WebTV type device 361, which records and reacts to the mouse click. Other elements of the system shown in FIG. 11 are the same as shown in FIGS. 6 and 3.

Figure 12:
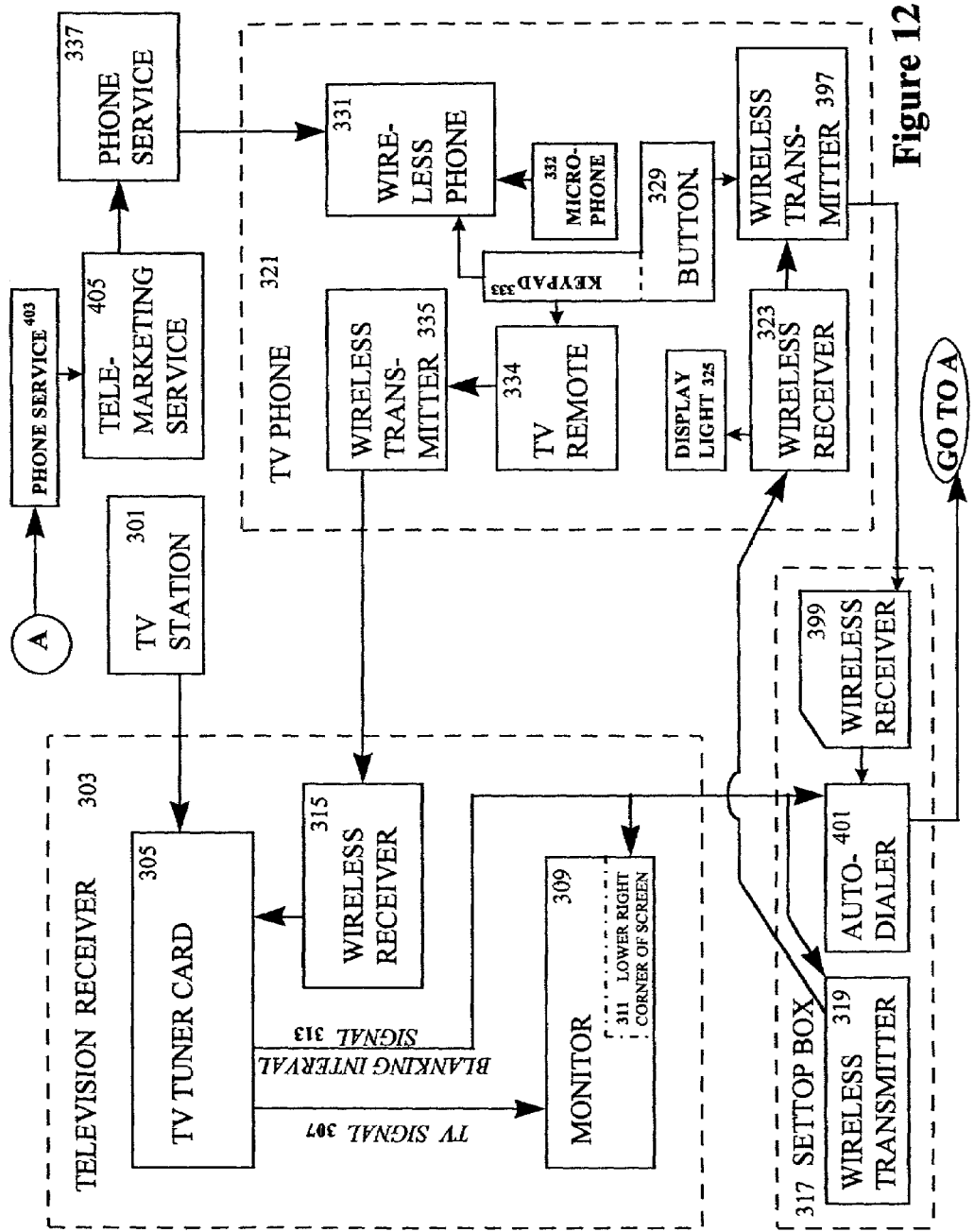
FIG. 12 shows the data flows associated with an alternate embodiment of the present invention in which activation results in a phone call being placed by a telemarketer to the user, rather than the user placing the call.

FIG. 12 shows an alternate embodiment of the present invention. Data flows from the TV Station 301 to the Television Receiver 303 and then to the TV Phone SetTop Box 317, in the same manner as in FIG. 3. However, the set-top box does not send the phone number to the TV Phone, but sends the number to an autodialer 401 in the SetTop Box 317. The SetTop Box 317 sends a signal via the wireless transmitter 319 to the TV Phone 321 that a phone number is available to access. The signal is received by a wireless receiver 323 and a display light 325 lights up. If the user wants to access the phone number, the user presses the special button 329 on the TV Phone. When the special button is pressed, a wireless transmitter 397 sends a signal to a wireless receiver 399 in the SetTop Box 317. The autodialer 401 in the SetTop Box 317 makes a phone or data call through the phone service 403 to the phone number representing a telemarketing service. The phone or data call gives the telephone number by which the TV Phone can be called by third parties. Then the telemarketing service 405 makes a phone call through the phone service 337 to the wireless phone component 331 of the TV Phone.

The key difference between FIG. 12 and FIG. 3 is whether the user of the TV Phone makes the wireless call, or merely receives the wireless call. In some regions or countries, wireless calls are charged only to the person who dials the call, whereas in other regions or countries, wireless calls are charged only to the person who receives the call. In other places, both caller and receiver are charged. The commercial viability of the present invention may depend on who is charged for the call. The different embodiments provide for the different way wireless phone charges are billed.

Other elements of the system shown in FIG. 12 are the same as shown in FIG. 3.

Figure 13:
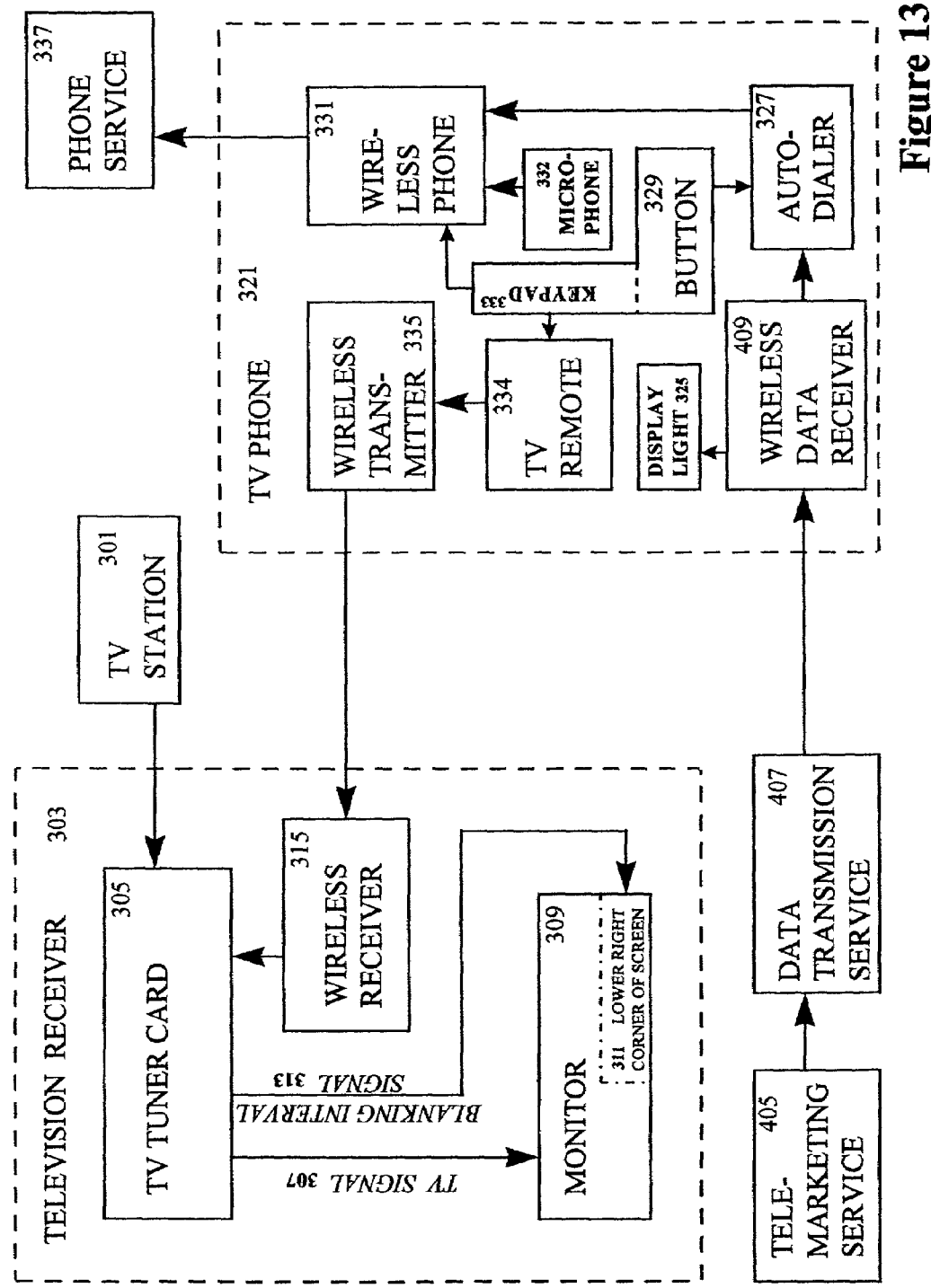
FIG. 13 shows the data flows associated with an alternate embodiment of the present invention in which activation results in a phone call being placed wirelessly from the telemarketer to the TV Phone.

FIG. 13 shows an alternate embodiment of the present invention, in which the phone number is not transmitted from the television receiver 303 to the TV Phone 321. Rather, the phone numbers are transferred from the telemarketing service 405 to a data transmission service 407 which transmits the data to a wireless data receiver 409 in the TV Phone 321. The user must use the keypad 333 to set which television channel (or network) he or she is watching. Then, when there is a number to be dialed on that channel, the wireless data receiver 409 lights up the display light 325 and transfers the telephone number to the auto dialer 327. A particular television network (or channel number) may be airing different advertisements and advertised phone numbers in different localities and time zones. However, the triangulation feature of cell phones that is required by government agencies, such as the FCC to enable emergency units to locate a cell phone caller, can be used to distinguish locations and time zones.

In any event, as in FIG. 3, pressing the special button 329 causes the autodialer 327 to make the phone call. The TV Phone operates as a TV remote control 334 and 335 as in FIG. 3, but changing the channels via the built in TV remote 334 tells the wireless data receiver 409 which network or local channel is active, and which phone numbers to use.

Other elements of the system shown in FIG. 13 are the same as shown in corresponding numbered items in FIG. 3.

Figure 14:
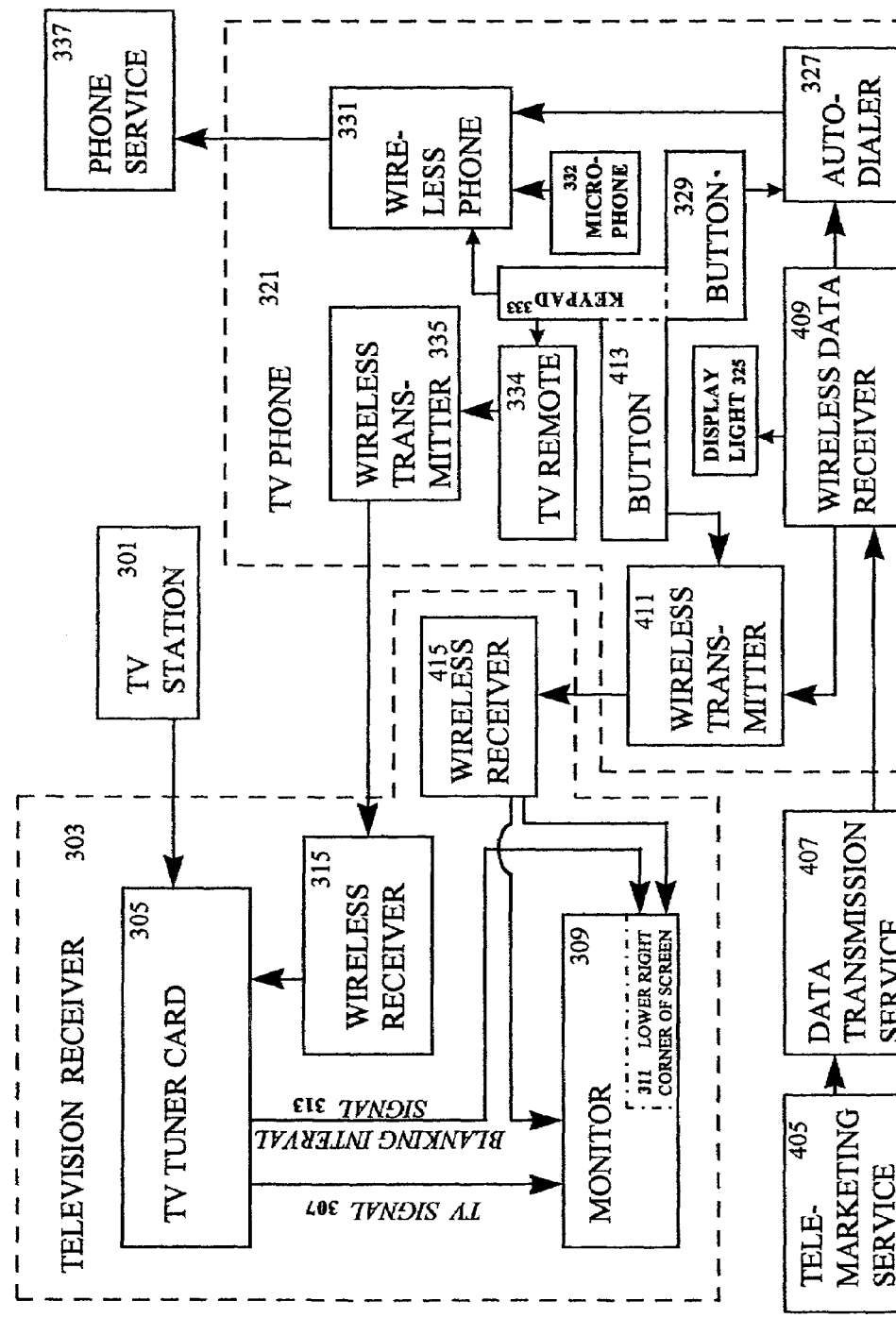
FIG. 14 shows the data flows associated with an alternate embodiment of the present invention in which the TV Phone can transmit data to a nearby television for display on the television's monitor.

FIG. 14 shows an alternate embodiment of the present invention, in which the phone number is not transmitted from the television receiver 303 to the TV Phone 321. Rather, as in FIG. 13, the phone numbers are transferred from a data transmission service 407 to a wireless data receiver 409 in the TV Phone 321. In addition, in the embodiment shown in FIG. 14, the TV Phone receives other data from the data transmission service, such as e-mail, Internet access, and the like. The data may be delivered using the WAP protocol or other protocol. The data may be displayed on a small LCD screen 111 on the TV Phone (shown in FIG. 1C but not shown in the data flows of FIG. 14) or delivered to the user via voice or audio interface using a speaker 109 (shown in FIG. 1C but not shown in FIG. 14). Because of the small size of the screens in cell phones, more data can be transmitted to the cell phone than can be usefully displayed. For some applications, only portions of the data are displayed. For some applications, only text is displayed and accompanying pictures are not. In current Internet-enabled cell phones, the "excess" information that cannot be usefully displayed is not transmitted by the data service to the cell phone. The TV Phone 321 receives this additional information and transfers it to a special wireless transmitter 411. When the user presses a special button 413 (or pre-defined combination of other buttons), the data is sent to a wireless receiver 415 in the television set. The data is processed by electronics associated with this wireless receiver (not shown separately) and then displayed on the television monitor 309. If the data includes a phone number accessible by the TV Phone 321, this number is displayed in the lower right corner of the screen 311, whereas the wireless data receiver 409 in the TV Phone 321 places the number in autodialer 327.

This embodiment does not require the television to have a direct Internet connections, but enables a user to have a television monitor (or similarly equipped computer monitor) display information received by the TV Phone 321, but display that information on a much larger screen than is possible on a cell phone.

This transmitter 411 may be combined with other wireless transmitters used by the TV Phone 321 such as 335, or may operate on different frequencies or protocols. For example, the wireless transmitter 335 that permits the TV Phone 321 to operate as a television remote control may operate on an infrared protocol, whereas the wireless transmitter 411 may operate using the BlueTooth protocol designed to allow wireless communications among household devices. This description is not intended to limit the included protocols and frequencies, and the scope of the present invention is intended to include other acceptable protocols for the various functions of the TV Phone 321 which are known to those skilled in the art.

Other elements of the system shown in FIG. 14 are the same as shown in corresponding numbered items in FIG. 13.

As in previous figures, an alternative embodiment includes voice recognition software (not shown in FIG. 14), so that transmitting the data from the TV Phone 321 to the television set occurs upon voice command.

Figure 15:
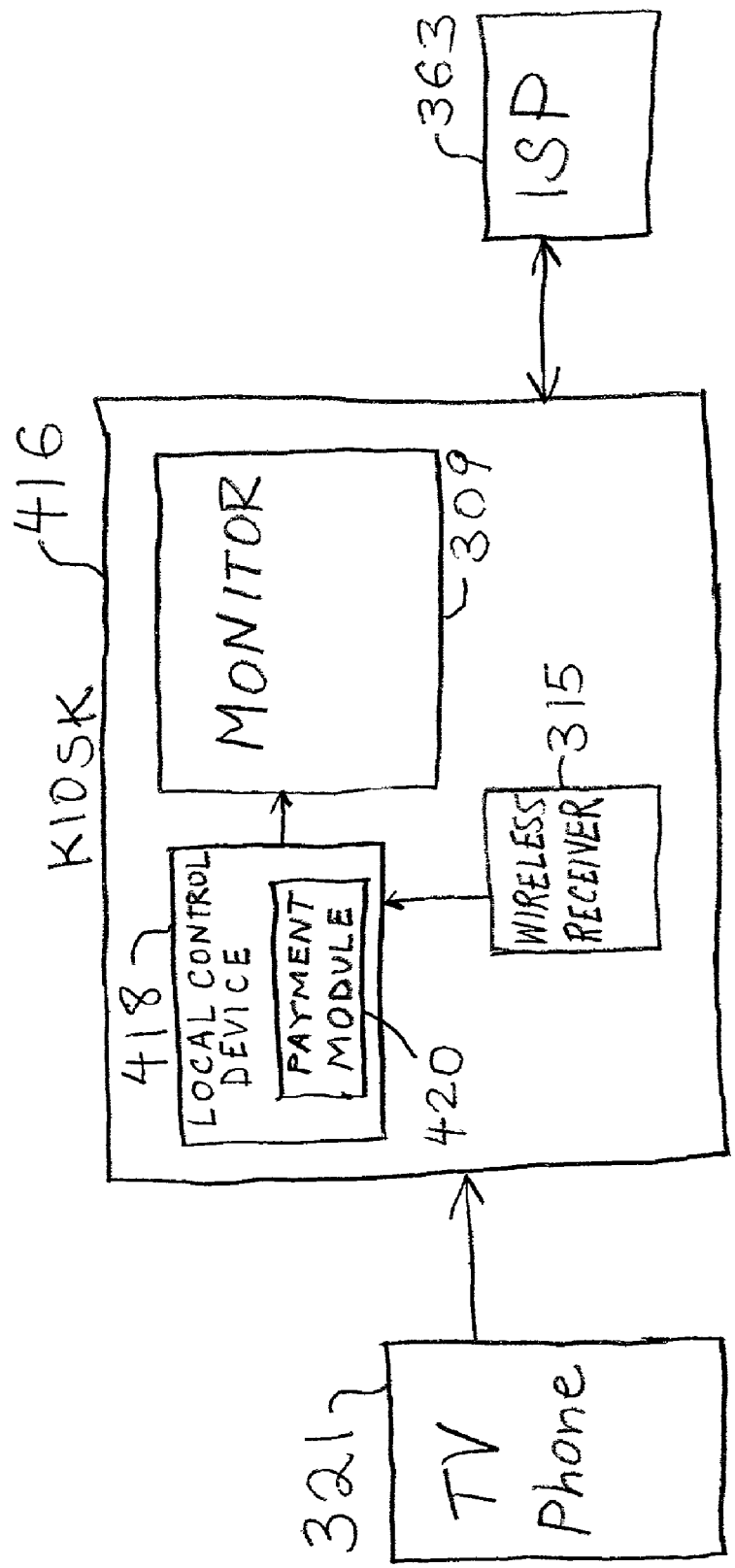
FIG. 15 shows the data flows associated with an alternate embodiment of the present invention in which the TV Phone can transmit data to a nearby kiosk for display on a television monitor of the kiosk.

FIG. 15 shows an alternate embodiment of the present invention, in which content, or the electronic address of content, is transmitted from the TV Phone 321 to a kiosk 416. The kiosk 416 includes a wireless receiver 315 and a monitor 309 as described above, and is also connected to an ISP 363 as described above. However, unlike previous embodiments, the kiosk 416 also includes a local control device 418 which includes a payment module 420 therein. The payment module 420 tracks usage charges for providing content to the display screen. In this scheme, the TV Phone 321 communicates customer identity information, such as the telephone number of the TV Phone 321, to the payment module 420. The payment module 420 inhibits the completion of the process unless the payment module 420 properly authorizes the TV Phone 321 to use the monitor 309 for viewing content. This embodiment allows a TV Phone user to view content, or the content located at an electronic address, delivered to the TV Phone 321 on a larger screen display (here, monitor 309 of the kiosk 416). The TV Phone 321 may be similar to the TV phones described above, or may be a WAP-enabled phone or an i-mode phone. The payment module 420 tracks usage fees and bills the paying party accordingly.

Alternate embodiments of the present invention not only indicate that a phone number can be called by a display light 325 on the TV Phone 321, but also show the phone number in the LCD screen 111 (or other display screen) of the TV Phone 321.

Alternate embodiments of the TV Phone 321 include a built-in camera (not shown) to allow the TV Phone 321 to act as a "picture phone," transmitting video along with the audio.

Alternate embodiments have a built in GPS device to determine the location of the TV Phone 321 in order to help determine which phone number is to be dialed or which data code is to accessed. The location determines which time zone the TV Phone 321 is operating from. With this knowledge, the device only needs to know which station or network is being accessed and broadcaster "playlists" provide the rest of the information. The location assists the use of the TV Phone 321 to receive phone numbers or data from location-based billboards or other media.

Alternate embodiments use the other location procedures, such as the triangulation to determine the location of the TV Phone 321. U.S. Federal regulations have required that such location devices or software be incorporated into cell phones and cell phone networks in order to assist 911 emergency systems.

Although the present invention has been described as receiving data primarily from a television set, it may receive data, phone numbers or access codes from other appliances, such as radios. It may receive data from wireless transmitters in billboards, or other outdoor signs, or other printed or audiovisual media or data sources. The scope of the present invention is to enable an individual with a TV phone to access additional information regarding other real world objects and events with a click of the button or at a verbal command.

Although the present invention has been described as receiving phone number data over the television blanking interval, it may also receive that data over other intervals, over other portions of the broadcast or wireless spectrum, over the Internet or other network, over segregated channels or data streams over a cable television network, along with or over the communications transfer of online or broadcast program guides (including interactive program guides), as additional coded data along with the standard television signal, over portions of the additional spectrum allocated with HDTV (High Definition TV) channels, and other forms, methods and protocols for data distribution.

Although the disclosure above refers to connecting viewers to "web sites" and "web site addresses," the scope of the present invention includes other non-Internet-type electronic addressing schemes wherein a user inputs a location or address containing desired content and an electronic network connects the user to the location or address to obtain the content.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of using a telephone device to allow a user to communicate with a remotely located entity, the telephone device including (i) a button which facilitates communication between the telephone device and the remotely located entity, and (ii) a wireless receiver, the method comprising:
    (a) an object or a device connected to an object emitting a signal containing an electronic address of the remotely located entity;
    (b) the wireless receiver receiving and automatically capturing the signal emitted by the object or the device connected to the object without selection of any buttons on the telephone device; and
    (c) the telephone device automatically establishing communication with the remotely located entity upon selection by the user of the button, wherein selection of the button causes the telephone device to automatically contact the electronic address contained within the emitted signal.

2. The method of claim 1 wherein the electronic address is a web site address of the remotely located entity, and selection of the button causes the telephone device to automatically go to the web site address of the remotely located entity.

3. The method of claim 2 wherein the telephone device further includes (iii) a display screen that displays content, the method further comprising:
    (d) the web site of the remotely located entity displaying content on the display screen retrieved by the telephone device during the communication with the remotely located entity.

4. The method of claim 1 wherein the automatic establishment of two-way communication with the remotely located entity in step (c) occurs by:
    (i) the telephone device automatically dialing the telephone number of the remotely located entity and communicating user identity information to the remotely located entity, and
    (ii) the remotely located entity using the user identity information to initiate a call to the telephone device.

5. The method of claim 4 wherein the user identity information is the telephone number of the telephone device.

6. The method of claim 1 wherein the telephone device includes transceiver circuitry associated with normal telephone communication functions which is separate from the wireless receiver, and the communication in step (c) uses only the transceiver circuitry.

7. A method of using a wireless telephone device and a set-top box of a TV system to allow a user to communicate with a remotely located entity, the wireless telephone device including a button which facilitates communication between the telephone and the remotely located entity, the set-top box including a base station of the wireless telephone device, the set-top box being in communication with a telephone system and being connected to a television, the method comprising:
- (a) the set-top box storing a telephone number and causing telephone number information to be displayed on the television;
- (b) upon selection by the user of the button, the telephone device sending a signal to the set-top box to dial the telephone number that is stored in the set-top box, thereby establishing two-way communication between the telephone device and the remotely located entity via the base station and the telephone system;
- (c) the set-top box prestoring a listing of telephone numbers corresponding to specified television stations, wherein the telephone number dialed in step (b) is the prestored telephone number of the currently active television channel; and
- (d) the television station automatically forwarding any received telephone calls to a telephone number of the remotely located entity.

8. The method of claim 7 wherein the establishment of two-way communication with the remotely located entity in step (b) occurs by:
- (i) the telephone device sending a signal to the set-top box to dial the telephone number of the remotely located entity and communicating user identity information to the remotely located entity, and
- (ii) the remotely located entity using the user identity information to initiate a call to the telephone device.

9. The method of claim 7 wherein the user identity information is the telephone number of the telephone device.

10. The method of claim 7 further comprising:
- (e) the user engaging in an audio session with a person or machine at the remotely located entity upon establishing the two-way communication.

11. The method of claim 7 wherein the telephone system is external to the TV system.

12. The method of claim 7 wherein the telephone system uses the TV system for establishing and maintaining the two-way communication.

13. The method of claim 7 wherein the telephone number information is the telephone number stored at the set-top box.

14. The method of claim 7 wherein the telephone number information is a telephone icon which indicates that the telephone number stored at the set-top box will be dialed upon selection of the button.

15. The method of claim 7 wherein the telephone number information is the telephone number stored at the set-top box and a telephone icon which indicates that the telephone number stored at the set-top box will be dialed upon selection of the button.

16. The method of claim 7 further comprising:
- (e) the set-top box receiving the telephone number which is stored in step (a) from broadcast signals sent by the TV system.

* * * * *